United States Patent
Ng et al.

(10) Patent No.: US 12,509,660 B2
(45) Date of Patent: Dec. 30, 2025

(54) SOX9-INDUCED OLIGODENDROCYTE PROGENITOR CELLS

(71) Applicant: President and Fellows of Harvard College, Cambridge, MA (US)

(72) Inventors: Hon Man Alex Ng, Cambridge, MA (US); Parastoo Khoshakhlagh, Cambridge, MA (US); George M. Church, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 921 days.

(21) Appl. No.: 17/536,807

(22) Filed: Nov. 29, 2021

(65) Prior Publication Data

US 2022/0204926 A1    Jun. 30, 2022

Related U.S. Application Data

(63) Continuation of application No. PCT/US2020/035069, filed on May 29, 2020.

(60) Provisional application No. 62/855,135, filed on May 31, 2019.

(51) Int. Cl.
 C12N 5/079    (2010.01)
 A61K 35/30    (2015.01)
 C12N 9/12    (2006.01)
 C12N 15/85    (2006.01)
 C12N 15/90    (2006.01)

(52) U.S. Cl.
 CPC ............ C12N 5/0622 (2013.01); A61K 35/30 (2013.01); C12N 9/1241 (2013.01); C12N 15/85 (2013.01); C12N 15/90 (2013.01); *C12N 2501/231* (2013.01); *C12N 2501/24* (2013.01); *C12N 2501/60* (2013.01); *C12N 2506/45* (2013.01)

(58) Field of Classification Search
 CPC .... C07K 14/495; C12N 5/0622; C12N 15/90; C12N 15/85; C12N 9/1241; C12N 2501/60; C12N 2506/45; C12N 2501/231; C12N 2501/24; C12N 2510/00; A61K 35/30; A01K 2217/075; A01K 2267/0318; A01K 2227/105
 See application file for complete search history.

(56) References Cited

U.S. PATENT DOCUMENTS

| | | |
|---|---|---|
| 7,812,124 B2 | 10/2010 | Palm |
| 9,057,053 B2 | 6/2015 | Wernig et al. |
| 9,273,119 B2 | 3/2016 | Maizels et al. |
| 9,487,757 B2 | 11/2016 | Tesar et al. |
| 9,732,128 B2 | 8/2017 | West et al. |
| 11,788,131 B2 | 10/2023 | Ng et al. |
| 11,845,960 B2 | 12/2023 | Ng et al. |
| 12,031,153 B2 * | 7/2024 | Khoshakhlagh ..... C12N 5/0606 |
| 12,195,756 B2 * | 1/2025 | Khoshakhlagh ..... C12N 5/0622 |
| 2003/0092009 A1 | 5/2003 | Palm |
| 2004/0219575 A1 | 11/2004 | Neuman et al. |
| 2007/0161023 A1 | 7/2007 | Palm |
| 2009/0176724 A1 | 7/2009 | Shen et al. |
| 2010/0093092 A1 | 4/2010 | Bamdad et al. |
| 2010/0159595 A1 | 6/2010 | Zhang et al. |
| 2011/0154518 A1 | 6/2011 | Kim et al. |
| 2012/0070419 A1 | 3/2012 | Christiansen-Weber |
| 2012/0107284 A1 | 5/2012 | Kozlova |
| 2012/0129262 A1 | 5/2012 | West et al. |
| 2012/0157474 A1 | 6/2012 | Dreyfuss et al. |
| 2012/0207744 A1 | 8/2012 | Mendlein et al. |
| 2013/0022583 A1 | 1/2013 | Wernig et al. |
| 2013/0029423 A1 | 1/2013 | Yamanaka et al. |
| 2013/0160152 A1 | 6/2013 | Ostertag et al. |
| 2013/0309769 A1 | 11/2013 | Benvenisty et al. |
| 2013/0330825 A1 | 12/2013 | Couture et al. |
| 2014/0170752 A1 | 6/2014 | Pulst et al. |
| 2014/0234971 A1 | 8/2014 | Slukvin et al. |
| 2015/0044187 A1 | 2/2015 | Visel et al. |
| 2015/0284681 A1 | 10/2015 | Wernig et al. |
| 2015/0352154 A1 | 12/2015 | Goldman et al. |
| 2016/0010056 A1 | 1/2016 | Nakaki et al. |
| 2016/0038544 A1 | 2/2016 | Keller et al. |
| 2016/0201053 A1 | 7/2016 | Maizels et al. |
| 2016/0237402 A1 | 8/2016 | Tilly et al. |
| 2017/0087192 A1 | 3/2017 | Tilly et al. |
| 2018/0127714 A1 | 5/2018 | Ko |
| 2018/0289748 A9 | 10/2018 | Tilly et al. |
| 2019/0017032 A1 | 1/2019 | Firas et al. |

(Continued)

FOREIGN PATENT DOCUMENTS

| | | |
|---|---|---|
| CN | 101914492 A | 12/2010 |
| CN | 102796696 A | 11/2012 |

(Continued)

OTHER PUBLICATIONS

Moyon et al. Demyelination Causes Adult CNS Progenitors to Revert to an Immature State and Express Immune Cues That Support Their Migration. The Journal of Neuroscience (2015), 35(1), 4-20. (Year: 2015).*

Bian et al. Sequential Differentiation of Embryonic Stem Cells into Neural Epithelial-Like Stem Cells and Oligodendrocyte Progenitor Cells. PLoS One (2016), 11(5), e1055227; (Year: 2016).*

Salewski et al. The Generation of Definitive Neural Stem Cells from PiggyBac Transposon-Induced Pluripotent Stem Cells Can Be Enhanced by Induction of the NOTCH Signaling Pathway. Stem Cells and Development (2013), 22(3), 383-396. (Year: 2013).*

Kaji et al. Virus-free induction of pluripotency and subsequent excision of reprogramming factors. Nature (2009), 458(7239), 771-775. (Year: 2009).*

(Continued)

*Primary Examiner* — Sean C. Barron
(74) *Attorney, Agent, or Firm* — Wolf, Greenfield & Sacks, P.C.

(57) ABSTRACT

Provided herein is a differentiation agent that consists essentially of SOX9 for the production of oligodendrocyte progenitor cells (OPCs) from pluripotent stem cells (PSC). Also provided herein are methods of producing the PSCs and methods of using the PSCs to produce OPCs and oligodendrocytes.

20 Claims, 9 Drawing Sheets

Specification includes a Sequence Listing.

(56) References Cited

U.S. PATENT DOCUMENTS

| | | |
|---|---|---|
| 2019/0099452 A1 | 4/2019 | Jiang et al. |
| 2019/0233795 A1 | 8/2019 | Ng et al. |
| 2020/0063105 A1 | 2/2020 | Ng et al. |
| 2021/0054448 A1 | 2/2021 | Ng et al. |
| 2021/0171902 A1 | 6/2021 | Khoshakhlagh et al. |
| 2024/0117312 A1 | 4/2024 | Ng et al. |
| 2024/0209321 A1 | 6/2024 | Ng et al. |
| 2024/0209435 A1 | 6/2024 | Ng et al. |
| 2024/0254437 A1 | 8/2024 | Khoshakhlagh et al. |
| 2024/0309318 A1 | 9/2024 | Khoshakhlagh et al. |

FOREIGN PATENT DOCUMENTS

| | | |
|---|---|---|
| CN | 106456672 A | 2/2017 |
| CN | 109072200 A | 12/2018 |
| EP | 3118306 A1 | 1/2017 |
| JP | 2021-040578 A | 3/2021 |
| WO | WO 2004/060302 A2 | 7/2004 |
| WO | WO 2006/005043 A2 | 1/2006 |
| WO | WO 2008/153568 A1 | 12/2008 |
| WO | WO 2009/029315 A2 | 3/2009 |
| WO | WO 2009/029315 A9 | 5/2009 |
| WO | WO 2009/137674 A2 | 11/2009 |
| WO | WO 2009/137844 A2 | 11/2009 |
| WO | WO 2011/091048 A1 | 7/2011 |
| WO | WO 2012/054896 A1 | 4/2012 |
| WO | WO 2013/124309 A1 | 8/2013 |
| WO | WO 2013/170146 A1 | 11/2013 |
| WO | WO 2015/049677 A1 | 4/2015 |
| WO | WO 2015/084908 A1 | 6/2015 |
| WO | WO 2015/179822 A1 | 11/2015 |
| WO | WO 2016/012570 A1 | 1/2016 |
| WO | WO 2016/103269 A1 | 6/2016 |
| WO | WO 2016/120493 A1 | 8/2016 |
| WO | WO 2016/163958 A1 | 10/2016 |
| WO | WO 2017/015075 A1 | 1/2017 |
| WO | WO 2018/049382 A1 | 3/2018 |
| WO | WO 2018/204262 A1 | 11/2018 |
| WO | WO 2019/108894 A1 | 6/2019 |
| WO | WO 2020/243392 A1 | 12/2020 |
| WO | WO 2020/243643 A1 | 12/2020 |

OTHER PUBLICATIONS

Carey et al. Reprogramming of murine and human somatic cells using a single polycistronic vector. PNAS (2009), 106(1), 157-162 plus appended Correction. (Year: 2009).*

Nishiyama et al. Uncovering Early Response of Gene Regulatory Networks in ESCs by Systematic Induction of Transcription Factors. Cell Stem Cell (2009), 5(4), 420-433. (Year: 2009).*

International Search Report and Written Opinion for Application No. PCT/US2020/035069, mailed Sep. 9, 2020.

International Preliminary Report on Patentability for Application No. PCT/US2020/035069, mailed Dec. 9, 2021.

[No Author Listed], Genbank Submission; NIH/NCBI, Accession No. EF587698. Jul. 16, 2007. 2 pages.

[No Author Listed], Genbank Submission; NIH/NCBI, Accession No. NM_203289. Dec. 28, 2019. 4 pages.

[No Author Listed], Genbank Submission; NIH/NCBI, Accession No. EF687698. Dec. 8, 2016. 1 page.

[No Author Listed], Genbank Submission; NIH/NCBI, Accession No. NM_001173531. Dec. 28, 2019. 4 pages.

[No Author Listed], Genbank Submission; NIH/NCBI, Accession No. NM_001285986. Dec. 28, 2019. 4 pages.

[No Author Listed], Genbank Submission; NIH/NCBI, Accession No. NM_001285987. Dec. 28, 2019. 4 pages.

[No Author Listed], Genbank Submission; NIH/NCBI, Accession No. NM_002176. Dec. 31, 2019. 3 pages.

[No Author Listed], Genbank Submission; NIH/NCBI, Accession No. NM_002701. Dec. 31, 2019. 5 pages.

[No Author Listed], Genbank Submission; NIH/NCBI, Accession No. NM_005806. Sep. 27, 2019. 3 Pages.

[No Author Listed], Genbank Submission; NIH/NCBI, Accession No. NM_006168. Aug. 2, 2019. 3 pages.

[No Author Listed], Genbank Submission; NIH/NCBI, Accession No. NM_152568. Oct. 23, 2019. 3 pages.

[No Author Listed], Genbank Submission; NIH/NCBI, Accession No. NM_177400. Oct. 1, 2019. 3 pages.

[No Author Listed], Genbank Submission; NIH/NCBI, Accession No. NM_000572. May 28, 2019. 4 pages.

[No Author Listed], Genbank Submission; NIH/NCBI, Accession No. Z46629. Oct. 7, 2008. 3 pages.

[No Author Listed], ORFeome Collaboration. The ORFeome Collaboration: a genome-scale human ORF-clone resource. Nat Methods. Mar. 2016; 13(3):191-2. doi: 10.1038/nmeth.3776.

Adamson et al., A Multiplexed Single-Cell CRISPR Screening Platform Enables Systematic Dissection of the Unfolded Protein Response. Cell. Dec. 15, 2016;167(7):1867-1882.e21. doi: 10.1016/j.cell.2016.11.048.

Beneviste et al., Type I interferons as anti-inflammatory mediators. Sci STKE. Dec. 11, 200712007(416):pe70.

Bi et al., Sox9 is required for cartilage formation. Nat Genet. May 1999;22(1):85-9.

Bornsen et al., Endogenous interferon-β-inducible gene expression and interferon-β-treatment are associated with reduced T cell responses to myelin basic protein in multiple sclerosis. PLoS One. Mar. 4, 2015;10(3):e0118830. doi: 10.1371/journal.pone.0118830.

Burdo et al., The Maize TFome—development of a transcription factor open reading frame collection for functional genomics. Plant J. Oct. 2014;80(2):356-66. doi: 10.1111/tpj.12623. Epub Aug. 26, 2014.

Busskamp et al., Rapid neurogenesis through transcriptional activation in human stem cells. Mol Syst Biol. Nov. 17, 2014;10:760(1-21). doi: 10.15252/msb.20145508.

Cannella et al., Multiple sclerosis: cytokine receptors on oligodendrocytes predict innate regulation. Ann Neurol. Jan. 2004;55(1):46-57.

Carstens, Identification and nucleotide sequence of the regions of Autographa californica nuclear polyhedrosis virus genome carrying insertion elements derived from Spodoptera frugiperda. Virology. Nov. 1987;161(1):8-17. doi: 10.1016/0042-6822(87)90165-6.

Chanda et al., Generation of induced neuronal cells by the single reprogramming factor ASCL1. Stem Cell Reports. Aug. 12, 2014;3(2):282-96. doi: 10.1016/j.stemcr.2014.05.020. Epub Jul. 4, 2014.

Chavez et al., Comparative analysis of Cas9 activators across multiple species. Nat Methods. Jul. 2016;13(7):563-567. doi: 10.1038/nmeth.3871. Epub May 23, 2016. Author Manuscript, 16 pages.

Chavez et al., Highly efficient Cas9-mediated transcriptional programming. Nat Methods. Apr. 2015;12(4):326-8. doi: 10.1038/nmeth.3312. Epub Mar. 2, 2015. Author Manuscript, 11 pages.

Chen et al., Inducing goat pluripotent stem cells with four transcription factor mRNAs that activate endogenous promoters. BMC Biotechnol. 2017;17(1):11(1-10). Published Feb. 13, 2017. doi:10.1186/s12896-017-0336-7.

Choi et al., A comparison of genetically matched cell lines reveals the equivalence of human iPSCs and ESCs. Nat Biotechnol. Nov. 2015;33(11):1173-81. doi: 10.1038/nbt.3388. Epub Oct. 26, 20156 Author Manuscript, 22 pages.

Darr et al., Overexpression of NANOG in human ES cells enables feeder-free growth while inducing primitive ectoderm features. Development. Mar. 2006;133(6):1193-201.

Dendrou et al., Immunopathology of multiple sclerosis. Nat Rev Immunol. Sep. 15, 2015;15(9):545-58. doi: 10.1038/nri3871. Epub Aug. 7, 2015.

Dixit et al., Perturb-Seq: Dissecting Molecular Circuits with Scalable Single-Cell RNA Profiling of Pooled Genetic Screens. Cell. Dec. 15, 2016;167(7):1853-1866.e17. doi: 10.1016/j.cell.2016.11.038.

Douvaras et al., Generation and isolation of oligodendrocyte progenitor cells from human pluripotent stem cells. Nat Protoc. Aug. 2015;10(8):1143-54. doi: 10.1038/nprot.2015.075. Epub Jul. 2, 2015.

Ehrlich et al., Rapid and efficient generation of oligodendrocytes from human induced pluripotent stem cells using transcription

(56) References Cited

OTHER PUBLICATIONS factors. Proc Natl Acad Sci U S A. Mar. 14, 2017;114(11):E2243-E2252. doi: 10.1073/pnas.1614412114. Epub Feb. 28, 2017.
Fraser et al., Acquisition of Host Cell DNA Sequences by Baculoviruses: Relationship Between Host DNA Insertions and FP Mutants of Autographa californica and Galleria mellonella Nuclear Polyhedrosis Viruses. J Virol. Aug. 1983;47(2):287-300. doi: 10.1128/JVI.47.2.287-300.1983.
Garcia-Leon et al., SOX10 Single Transcription Factor-Based Fast and Efficient Generation of Oligodendrocytes from Human Pluripotent Stem Cells. Stem Cell Reports. Feb. 13, 2018;10(2):655-672. doi: 10.1016/j.stemcr.2017.12.014. Epub Jan. 11, 2018.
Gohl et al., Large-scale mapping of transposable element insertion sites using digital encoding of sample identity. Genetics. Mar. 2014;196(3):615-23. doi: 10.1534/genetics.113.159483. Epub Dec. 27, 2013.
Goldman et al., How to make an oligodendrocyte. Development. Dec. 1, 2015;142(23):3983-95. doi: 10.1242/dev.126409.
Goparaju et al., Rapid differentiation of human pluripotent stem cells into functional neurons by mRNAs encoding transcription factors. Sci Rep. Feb. 13, 2017;7:42367(1-12). doi: 10.1038/srep42367.
Gorbacheva et al., Improved transposon-based library preparation for the Ion Torrent platform. Biotechniques. Apr. 1, 2015;58(4):200-2. doi: 10.2144/000114277.
Gorris et al., Pluripotent stem cell-derived radial glia-like cells as stable intermediate for efficient generation of human oligodendrocytes. Glia. Dec. 2015;63(12):2152-67. doi: 10.1002/glia.22882. Epub Jun. 30, 2015.
Gradwohl et al., neurogenin3 is required for the development of the four endocrine cell lineages of the pancreas. Proc Natl Acad Sci U S A. Feb. 15, 2000;97(4):1607-11.
Haenebalcke et al., The ROSA26-iPSC mouse: a conditional, inducible, and exchangeable resource for studying cellular (De)differentiation. Cell Rep. Feb. 21, 2013;3(2):335-41. doi: 10.1016/j.celrep.2013.01.016. Epub Feb. 7, 2013.
Hou et al., Sleeping Beauty transposon system for genetic etiological research and gene therapy of cancers. Cancer Biol Ther. 2015;16(1):8-16. doi: 10.4161/15384047.2014.986944.
Hsieh et al., PKCalpha expression regulated by Elk-1 and MZF-1 in human HCC cells. Biochem Biophys Res Commun. 2006;339(1):217-225. doi:10.1016/j.bbrc.2005.11.015.
Hui et al., Isolation and functional characterization of the human gene encoding the myeloid zinc finger protein MZF-1. Biochemistry. 1995;34(50):16493-16502. doi:10.1021/bi00050a033.
Ivics et al., Molecular reconstruction of Sleeping Beauty, a Tc1-like transposon from fish, and its transposition in human cells. Cell. Nov. 14, 1997;91(4):501-10. doi: 10.1016/s0092-8674(00)80436-5.
Jaitin et al., Dissecting Immune Circuits by Linking CRISPR-Pooled Screens with Single-Cell RNA-Seq. Cell. Dec. 15, 2016;167(7):1883-1896.e15. doi: 10.1016/j.cell.2016.11.039.
Kim et al., Oct4-induced oligodendrocyte progenitor cells enhance functional recovery in spinal cord injury model. Embo J. Oct. 23, 2015334(23):2971-83.
Klein et al., Droplet barcoding for single-cell transcriptomics applied to embryonic stem cells. Cell. May 21, 2015;161(5):1187-1201 and Supplemental Info. doi: 10.1016/j.cell.2015.04.044.
Klose et al., Suppression of experimental autoimmune encephalomyelitis by interleukin-10 transduced neural stem/progenitor cells. J Neuroinflammation. Sep. 22, 2013;10:117. doi: 10.1186/1742-2094-10-117.
Levy et al., mRNA-engineered mesenchymal stem cells for targeted delivery of interleukin-10 to sites of inflammation. Blood. Oct. 3, 2013;122(14):e23-32. doi: 10.1182/blood-2013-04-495119. Epub Aug. 26, 2013.
Li et al., Neural Stem Cells Engineered to Express Three Therapeutic Factors Mediate Recovery from Chronic Stage CNS Autoimmunity. Mol Ther. Aug. 2016;24(8):1456-69. doi: 10.1038/mt.2016.104. Epub May 16, 2016.

Liao et al., Mesenchymal stem cells engineered to express selectin ligands and IL-10 exert enhanced therapeutic efficacy in murine experimental autoimmune encephalomyelitis. Biomaterials. Jan. 2016;77:87-97. doi: 10.1016/j.biomaterials.2015.11.005. Epub Nov. 10, 2015.
Macosko et al., Highly Parallel Genome-wide Expression Profiling of Individual Cells Using Nanoliter Droplets. Cell. May 21, 2015;161(5):1202-1214. doi: 10.1016/j.cell.2015.05.002.
Makar et al., Stem cell based delivery of IFN-beta reduces relapses in experimental autoimmune encephalomyelitis. J Neuroimmunol. May 30, 2008;196(1-2):67-81. doi: 10.1016/j.jneuroim.2008.02.014. Epub May 8, 2008.
Mohammadzadeh et al., Evaluation of AD-MSC (adipose-derived mesenchymal stem cells) as a vehicle for IFN-β delivery in experimental autoimmune encephalomyelitis. Clin Immunol. Aug. 2016;169:98-106. doi: 10.1016/j.clim.2016.06.015. Epub Jul. 1, 2016.
Morris et al., The myeloid zinc finger gene, MZF-1, regulates the CD34 promoter in vitro. Blood. 1995;86(10):3640-3647.
Mulvaney et al., Atoh1, an essential transcription factor in neurogenesis and intestinal and inner ear development: function, regulation, and context dependency. J Assoc Res Otolaryngol. Jun. 2012;13(3):281-93. doi: 10.1007/s10162-012-0317-4. Epub Feb. 28, 2012.
Najm et al., Transcription factor-mediated reprogramming of fibroblasts to expandable, myelinogenic oligodendrocyte progenitor cells. Nat Biotechnol. May 2013;31(5):426-33. doi: 10.1038/nbt.2561. Epub Apr. 14, 2013.
Neman et al., A method for deriving homogenous population of oligodendrocytes from mouse embryonic stem cells. Dev Neurobiol. Jun. 2012;72(6):777-88. doi: 10.1002/dneu.22008.
Ng, Differentiation of Human Cells and Tissues Using a Comprehensive Human Transcription Factor Library. Doctoral dissertation, Harvard University, Graduate School of Arts & Sciences. 2018. Retrieved from https://dash.harvard.edu/handle/1/41129209. 105 pages.
Nishiyama et al., Uncovering early response of gene regulatory networks in ESCs by systematic induction of transcription factors. Cell Stem Cell. Oct. 2, 2009;5(4):420-33. doi: 10.1016/j.stem.2009.07.012. Author Manuscript, 23 pages.
Opal et al., Anti-inflammatory cytokines. Chest. Apr. 2000;117(4):1162-72.
Pagliuca et al., Generation of functional human pancreatic β cells in vitro. Cell. Oct. 9, 2014;159(2):428-39. doi: 10.1016/j.cell.2014.09.040. Author Manuscript, 29 pages.
Pashai et al., Genome-wide profiling of pluripotent cells reveals a unique molecular signature of human embryonic germ cells. PLoS One. 2012;7(6):e39088(1-19). doi:10.1371/journal.pone.0039088.
Perrotti et al., Overexpression of the zinc finger protein MZF1 inhibits hematopoietic development from embryonic stem cells: correlation with negative regulation of CD34 and c-myb promoter activity. Mol Cell Biol. 1995;15(11):6075-6087. doi:10.1128/mcb.15.11.6075.
Rukstalis et al., Neurogenin3: a master regulator of pancreatic islet differentiation and regeneration. Islets. Nov.-Dec 2009;1(3):177-84. doi: 10.4161/isl.1.3.9877.
Sagal et al., Proneural transcription factor Atoh1 drives highly efficient differentiation of human pluripotent stem cells into dopaminergic neurons. Stem Cells Transl Med. Aug. 2014;3(8):888-98. doi: 10.5966/sctm.2013-0213. Epub Jun. 5, 2014.
Selvaraj et al., Switching cell fate: the remarkable rise of induced pluripotent stem cells and lineage reprogramming technologies. Trends Biotechnol. Apr. 2010;28(4):214-23. doi: 10.1016/j.tibtech.2010.01.002. Epub Feb. 9, 2010.
Simicevic et al., Absolute quantification of transcription factors during cellular differentiation using multiplexed targeted proteomics. Nat Methods. Jun. 2013;10(6):570-6. doi: 10.1038/nmeth.2441. Epub Apr. 14, 2013.
Singari et al., Singari S, Javeed N, Tardi NJ, Marada S, Carlson JC, Kirk S, Thorn JM, Edwards KA. Inducible protein traps with dominant phenotypes for functional analysis of the *Drosophila* genome. Genetics. Jan. 2014;196(1):91-105. doi: 10.1534/genetics.113.157529. Epub Oct. 30, 2013.

(56) References Cited

OTHER PUBLICATIONS

Sripal, Combined expression of microRNAs and transcription factors for promoting hair cell differentiation. 2013 Master's Thesis. Department of Biomedical Sciences. Creighton University, 89 pages. Submitted Jul. 29, 2013.

Stolt et al., The Sox9 transcription factor determines glial fate choice in the developing spinal cord. Genes Dev. Jul. 1, 2003;17(13):1677-89.

Suchorska et al., Comparison of Four Protocols to Generate Chondrocyte-Like Cells from Human Induced Pluripotent Stem Cells (hiPSCs). Stem Cell Rev Rep. Apr. 2017;13(2):299-308. doi: 10.1007/s12015-016-9708-y.

Takahashi et al., Induction of pluripotent stem cells from mouse embryonic and adult fibroblast cultures by defined factors. Cell. Aug. 25, 2006;126(4):663-76. Epub Aug. 10, 2006.

Trandem et al., Virally expressed interleukin-10 ameliorates acute encephalomyelitis and chronic demyelination in coronavirus-infected mice. J Virol. Jul. 2011;85(14):6822-31. doi: 10.1128/JVI.00510-11. Epub May 18, 2011.

Trounson, Pluripotent stem cells progressing to the clinic. Nat Rev Mol Cell Biol. Mar. 2016; 17(3):194-200. doi: 10.1038/nrm.2016.10.

Van Der Maaten et al., Visualizing Data using t-SNE. J Mach Learn Res. 2008;9(86):2579-2605.

Vaquerizas et al., A census of human transcription factors: function, expression and evolution. Nat Rev Genet. Apr. 2009;10(4):252-63. doi: 10.1038/nrg2538.

Walczak et al., Directed differentiation of human iPSC into insulin producing cells is improved by induced expression of PDX1 and NKX6.1 factors in IPC progenitors. J Transl Med. Dec. 20, 2016;14(1):341. doi: 10.1186/s12967-016-1097-0.

Wang et al., Human iPSC-derived oligodendrocyte progenitor cells can myelinate and rescue a mouse model of congenital hypomyelination. Cell Stem Cell. Feb. 7, 2013;12(2):252-64. doi: 10.1016/j.stem.2012.12.002.

Williams et al., SnapShot: directed differentiation of pluripotent stem cells. Cell. May 25, 2012;149(5):1174-1174.e1. doi: 10.1016/j.cell.2012.05.015. 2 pages.

Xiao et al., Mesenchymal stem cells and induced pluripotent stem cells as therapies for multiple sclerosis. Int J Mol Sci. Apr. 24, 2015;16(5):9283-302. doi: 10.3390/ijms16059283.

Yamakawa et al., Screening of Human cDNA Library Reveals Two differentiation-Related Genes, HHEX and HLX, as Promoters of Early Phase Reprogramming toward Pluripotency. Stem Cells. Nov. 2016;34(11):2661-2669. doi: 10.1002/stem.2436. Epub Jul. 8, 2016.

Yamamizu et al., Identification of transcription factors for lineage-specific ESC differentiation. Stem Cell Reports. Dec. 2013;1(6):545-59. doi: 10.1016/j.stemcr.2013.10.006. eCollection 2013.

Yamanaka, Induced pluripotent stem cells: past, present, and future. Cell Stem Cell. Jun. 14, 2012;10(6):678-684. doi: 10.1016/j.stem.2012.05.005.

Yang et al., Adult neural stem cells expressing IL-10 confer potent immunomodulation and remyelination in experimental autoimmune encephalitis. J Clin Invest. Dec. 2009;119(12):3678-91. doi: 10.1172/JCI37914. Epub Nov. 2, 2009.

Yang et al., Generation of oligodendroglial cells by direct lineage conversion. Nat Biotechnol. May 2013;31(5):434-9. doi: 10.1038/nbt.2564. Epub Apr. 14, 2013.

Zhang et al., Rapid single-step induction of functional neurons from human pluripotent stem cells. Neuron. Jun. 5, 2013;78(5):785-98. doi: 10.1016/j.neuron.2013.05.029.

[No Author Listed], Genbank Submission; NIH/NCBI, Accession No. NM_000572.2. Nov. 20, 2017. 3 pages.

[No Author Listed], Origene, Product datasheet for RC211285L1, BAPX1 (NKX3-2) (NM_001189) Human Tagged ORF Clone. Retrieved Nov. 15, 2022. https://www.origene.com/catalog/cdna-clones/expression-plasmids/rc211285l1/bapx1-nkx3-2-nm_001189-human-tagged-orf-clone.

Abed et al., Transplantation of macaca cynomolgus iPS-derived hematopoietic cells in NSG immunodeficient mice. Haematologica. Oct. 2015;100(10):e428-31. Epub Jun. 18, 2015.

Benabdellah et al., Development of an all-in-one lentiviral vector system based on the original TetR for the easy generation of Tet-ON cell lines. PLoS One. 2011;6(8):e23734. Epub Aug. 18, 2011.

Cao et al., Restoring BMP4 expression in vascular endothelial progenitors ameliorates maternal diabetes-induced apoptosis and neural tube defects. Cell Death Dis. Oct. 15, 2020;11(10):859.

Casey et al., Intrinsic DNA binding properties demonstrated for lineage-specifying basic helix-loop-helix transcription factors. Genome Res. Apr. 2018;28(4):484-496. doi: 10.1101/gr.224360.117. Epub Mar. 2, 2018.

Ikuno et al., Correction: efficient and robust differentiation of endothelial cells from human induced pluripotent stem cells via lineage control with VEGF and cyclic AMP. PLoS One. Apr. 17, 2017;12(4):e0176238. Erratum for: PLoS One. Mar. 13, 2017;12(3):e0173271.

Kim et al., Selective depletion of SSEA-3- and TRA-1-60-Positive undifferentiated human embryonic stem cells by magnetic activated cell sorter (MACS). Tissue Eng. and Regen. Med. 2011;8(2):253-261.

Klum et al., Sequentially acting SOX proteins orchestrate astrocyte- and oligodendrocyte-specific gene expression. EMBO Rep. Nov. 2018;19(11):e46635. Epub Aug. 30, 2018.

Kojo et al., Priming of lineage-specifying genes by Bcl11b is required for lineage choice in post-selection thymocytes. Nat Commun. Sep. 26, 2017;8(1):702. doi: 10.1038/s41467-017-00768-1.

Ng et al., A comprehensive library of human transcription factors for cell fate engineering. Nat Biotechnol. Apr. 2021;39(4):510-519. Epub Nov. 30, 2020. Author Manuscript, 37 pages.

Oestreich et al., Master regulators or lineage-specifying? Changing views on CD4+ T cell transcription factors. Nat Rev Immunol. Nov. 2012;12(11):799-804. doi: 10.1038/nri3321. Epub Oct. 12, 2012. Author Manuscript, 13 pages.

Patsch et al., Generation of vascular endothelial and smooth muscle cells from human pluripotent stem cells. Nat Cell Biol. Aug. 2015;17(8):994-1003. Epub Jul. 27, 2015. Supplementary Information, 9 pages.

Pozniak et al., Sox10 directs neural stem cells toward the oligodendrocyte lineage by decreasing Suppressor of Fused expression. Proc Natl Acad Sci U S A. Dec. 14, 2010;107(50):21795-800. Epub Nov. 22, 2010.

Rufaihah et al., Human induced pluripotent stem cell-derived endothelial cells exhibit functional heterogeneity. Am J Transl Res. 2013;5(1):21-35. Epub Jan. 21, 2013.

Ryu et al., Gene therapy of multiple sclerosis using interferon β-secreting human bone marrow mesenchymal stem cells. Biomed Res Int. 2013;2013:696738. Epub Apr. 22, 2013.

Sarkar et al., The sox family of transcription factors: versatile regulators of stem and progenitor cell fate. Cell Stem Cell. Jan. 3, 2013;12(1):15-30.

Ahlenius et al., Rapid and efficient induction of functional astrocytes from human pluripotent stem cells. Protocol Exchange. Aug. 20, 2018;(1). doi: 10.1038/protex.2018.088. 6 pages.

Michael et al., Cooperation between bHLH transcription factors and histones for DNA access. Nature. Jul. 2023;619(7969):385-393. doi: 10.1038/s41586-023-06282-3. Epub Jul. 5, 2023. Suppl Info, 33 pages.

Tanaka et al., Efficient and reproducible myogenic differentiation from human iPS cells: prospects for modeling Miyoshi Myopathy in vitro. PLoS One. Apr. 23, 2013;8(4):e61540. doi: 10.1371/journal.pone.0061540.

Wang et al., MyoD is a 3D genome structure organizer for muscle cell identity. Nat Commun. Jan. 11, 2022;13(1):205. doi: 10.1038/s41467-021-27865-6.

\* cited by examiner

O4 Expression

SOX9-INDUCED OLIGODENDROCYTE PROGENITOR CELLS

RELATED APPLICATIONS

This application is a continuation claiming the benefit of International Application No. PCT/US2020/035069, filed May 29, 2020, which claims the benefit under 35 U.S.C. § 119 (e) of U.S. provisional application No. 62/855,135, filed May 31, 2019, each of which is incorporated by reference herein in its entirety.

REFERENCE TO A SEQUENCE LISTING SUBMITTED AS A TEXT FILE VIA EFS-WEB

The instant application contains a Sequence Listing which has been submitted in text format via EFS-Web and is hereby incorporated by reference in its entirety. Said text copy, created on Nov. 29, 2021, is named H049870691US01-SEQ-FL and is 6,964 bytes in size.

BACKGROUND

Oligodendrocytes are a subtype of glial cells in the central nervous system that originate from oligodendrocyte progenitor cells (OPCs). OPCs account for about 5% of cells in the central nervous system. Oligodendrocytes help support and insulate axons by producing myelin. Myelin sheaths in the central nervous system are made of extended oligodendrocyte plasma membranes. While mature oligodendrocytes cannot self-renew, OPCs can repopulate oligodendrocytes following injury to the central nervous system in healthy individuals.

SUMMARY

The present disclosure provides experimental data demonstrating, unexpectedly, that overexpression of the transcription factor SOX9 is sufficient to generate oligodendrocyte progenitor cells (OPCs) (e.g., O4-positive OPCs) in as few as four days (e.g., without optimizing for cell growth and/or differentiation culture conditions) from induced pluripotent stem cells (iPSCs). This data was particularly surprising given that SOX9 has been implicated as the cardinal master regulator of chondrocyte development. Nonetheless, the data herein shows that chondrocyte morphologies were not observed after SOX9 overexpression—rather, SOX9 overexpression was sufficient to induce differentiation of oligodendrocytes.

Further, the oligodendrocytes produced, in some embodiments, are 'immunoprotective'—they secrete immunosuppressive factors (e.g., anti-inflammatory cytokines).

Accordingly, some aspects of the present disclosure provide methods that include contacting pluripotent stem cells (PSCs) with a transcription factor that consists essentially of SOX9. In some embodiments, the transcription factor consists essentially of one or more engineered nucleic acids that encode SOX9. In some embodiments, the methods further include introducing into pluripotent stem cells at least one engineered nucleic acid encoding interleukin 10 (IL-10) and/or interferon beta (IFNβ). In some embodiments, the methods further include culturing the OPCs to produce oligodendrocytes.

Yet other aspects of the present disclosure provide pharmaceutical compositions comprising the OPCs or the oligodendrocytes produced by the methods described herein. These pharmaceutical compositions may be used, for example, to treat (e.g., improve) a demyelinating disorder, such as multiple sclerosis, transverse myelitis, and other congenital and non-congenital demyelination disorders.

BRIEF DESCRIPTION OF THE DRAWINGS

FIG. 1A shows human induced pluripotent stem cells (hiPSCs) that show colony-like morphology with tight cell-cell packing and distinct clear colony boundaries. FIGS. 1B-1C show that transfected cells with SOX9 after four days of induction differentiate into a branched out and expanded morphology. FIG. 1D shows the percent of O4-positive, GalC-negative cells among the different populations made by transfecting different amounts of DNA: 5 µg, 10 µg and 20 µg. The graphs represent percentage of O4-positive, GalC-negative cells after treatment with doxycycline for four days.

FIGS. 2A-2B show a morphology change after four days in individual colonies. FIG. 2A shows control cells in the absence of doxycycline had no stem cell differentiation after four days. FIG. 2B shows that in the presence of doxycycline, cells differentiate and leave the iPSC colonies. FIGS. 2C-2D show that SOX9 rapidly and efficiently induces hiPSCs into induced oligodendrocytes at 4 dpi. Bar plots of flow cytometry for O4 (FIG. 2C) or NG2 (FIG. 2D) oligodendrocyte marker compared to non-induced cells.

FIG. 3A shows co-culture of OPCs and hiPSC-induced neurons after four weeks. The co-cultures were cross-sectioned and imaged using transmission electron microscopy. Layers of Myelin (M) wrap around an axon (A), demonstrating functionality of differentiated OPCs. FIG. 3B shows that differentiated OPCs are able to myelinate human cerebral organoids. Cerebral organoids mixed with inducible OPCs were induced to differentiate by SOX9 over-expression and stained positive for mature myelin marker MOG.

FIG. 5A shows TEM images of brain slices in a treatment cohort where the mice received the SOX9-induced OPCs. FIG. 5B shows TEM images of brain slices from a control group where the mice received PBS injections. White arrow shows compact myelin formation. Magnifications 9300X.

DETAILED DESCRIPTION

Figure 1A:
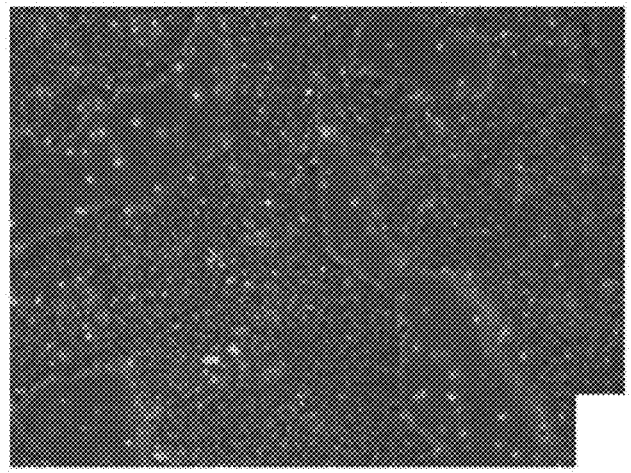
FIGS. 1A-1D show that SOX9 over-expression induces hiPSCs to differentiate into OPCs, not chondrocytes.

Induced pluripotent stem cells (iPSCs) are reprogrammed from adult differentiated cells and are capable of developing into many phenotypes. iPSCs may be obtained from a patient and changed into any cell type that is necessary to improve a particular condition, permitting patient-specific autologous clinical applications while simultaneously minimizing the risk of immune response or rejection as well as enabling scalable production of allogenic cells for similar clinical applications. Although the use of stem cell therapies for clinical applications such as neurodegenerative and myelin degenerative diseases, myocardial infarction, and bone defect repair have been promising, there are significant limitations relating to uncontrolled proliferation, low cell survival, negative immune responses, differentiation into undesired cell types, inconsistency and long procedure duration. For example, while neural stem cells may be used to generate oligodendrocytes, the process is inefficient and the cells frequently form neurons or astrocytes that have no myelin generating ability. O4-positive OPCs, meanwhile, appear to be mainly committed to develop into oligodendrocytes. Furthermore, it has been demonstrated that OPCs are capable of integrating into the CNS and remyelinate congenitally hypomyelinated mouse models (Najm et al., Nat. Biotechnol. 31, 426-433 (2013)). However, these protocols are still largely impractical in application due to the lengthy culture times, complicated culture conditions and low differentiation efficiency. For example one of the most technically successful protocols necessitates over 200 days of differentiation and 7 media conditions in order to get ~12% of the cells to express the surface marker O4 antigen (Wang et al., Cell Stem Cell. 12, 252-264 (2013)). In more recent studies, the timeline was shortened to 44-75 days and the regimen was simplified to 4-5 steps to achieve ~30%-70% O4 expression efficiency (Douvaras et al., Nat. Protoc. 10, 1143-54 (2015); Ehlrich et al., Proc Natl Acad Sci, 114(11):E2243-E2252 (2017)).

The technology provided herein overcomes many of these limitations. The present disclosure provides methods for SOX9-mediated direct reprogramming of stem cells, such as iPSCs, to generate a desired cell type, in some instances, in as few as 1 to 8 days with high efficiency (e.g., at least 40%, at least 50%, at least 60%, at least 70%, at least 80%, or at least 90% of the cells expressing markers of differentiation). For example, cells may be reprogrammed within 2-8, 3-8, or 4-8 days. In some embodiments, a cell may be reprogrammed using the methods described herein in less than 10 days, less than 9 days, less than 8 days, less than 7 days, less than 6 days, less than 5 days, less than 4 days, less than 3 days, less than 2 days, or less than 1 day. In some embodiments cells may be reprogrammed (e.g., express differentiation markers) within 1 day. In some embodiments cells may be reprogrammed (e.g., express differentiation markers) in 4 days. The present disclosure also provides methods for protecting the desired cell type from the immune (inflammatory) response.

Autoimmune diseases that are the result of dysfunctional immune systems may be amenable to stem cell therapies. Multiple sclerosis (MS), with a worldwide prevalence of approximately 2.5 million people, is an autoimmune disease that is a frequent mesenchymal stem cell (MSC) therapy target. Success to date has been limited, however, largely due to the above-mentioned limitations. Current strategies to overcome the hurdles of stem cells are still largely impractical in application due to the lengthy culture times, complicated culture conditions and low efficiency.

Data provided herein demonstrates that SOX9-mediated direct reprogramming of iPSCs can be utilized, in some embodiments, to generate OPCs (e.g., O4-positive OPCs) while requiring no media regimen optimization. This approach is considerably faster and more efficient than existing reprogramming methods. Data provided herein also shows that these iPSCs and the cells produced from these iPSCs can be programmed to secrete inflammatory cytokines, thus rendering the cells immunoprotective.

The present disclosure is based, at least in part, on unexpected results demonstrating that SOX9 is sufficient to induce the formation of OPCs. These OPCs may be used, for example, to rebuild the damaged myelin sheath surrounding axons in subjects having demyelinating disorders.

As used herein, a differentiation agent is an agent that causes differentiation (process where a cell changes from one cell type to another, e.g., a PSC herein can differentiate into an OPC). A lineage-specifying gene encodes a differentiation agent. Examples of differentiation agents, as used herein, include transcription factors (and nucleic acids encoding transcription factors), such as OLIG transcription factors (e.g., OLIG1, OLIG2, OLIG3 and OLIG4), NKX homeobox transcription factors (e.g., NKX2.1, NKX2.2, NKX6.1, NKX6.2, and NKX6.3), OCT transcription factors (e.g., OCT1, OCT2, October 4 and OCT6), SOX transcription factors (e.g., SRY, SOX1, SOX2, SOX3, SOX4, SOX5, SOX6, SOX7, SOX8, SOX9, SOX10, SOX11, SOX12, SOX13, SOX14, SOX15, SOX17, SOX18, SOX21 and SOX30), and ASCL transcription factors (e.g., ASCL1 and ASCL2). A transcription factor, as used herein, is a protein that binds to DNA of a promoter or enhancer region of a gene and interacts with a RNA polymerase or other transcription factors to regulate RNA transcription. See also, e.g., WO2018/049382, entitled, "TRANSCRIPTION FACTORS CONTROLLING DIFFERENTIATION OF STEM CELLS," which published on Mar. 15, 2018; WO 2019/108894, entitled, "METHODS AND COMPOSITIONS FOR THE PRODUCTION OF OLIGODENDROCYTE PROGENITOR CELLS," which published on Jun. 6, 2019; and US20200063105, entitled, "TRANSCRIPTION FACTORS CONTROLLING DIFFERENTIATION OF STEM CELLS," which published on Feb. 27, 2020.

In some embodiments, a method herein comprises (a) contacting PSCs (e.g., iPSCs) with a differentiation agent, wherein the differentiation agent consists essentially of SOX9, or one or more copies of a nucleic acid encoding SOX9, and (b) culturing the PSCs to produce a population of cells comprising OPCs. In other embodiments, a method herein comprises (a) contacting PSCs (e.g., iPSCs) with a transcription factor, wherein the transcription factor consists essentially of SOX9, or one or more copies of a nucleic acid encoding SOX9, and (b) culturing the PSCs to produce a population of cells comprising OPCs.

In some embodiments, the PSCs of the present disclosure do not include an exogenous transcription factor, or an exogenous nucleic acid encoding a transcription factor, other than SOX9. Thus, it should be understood that none of the PSCs consisting essentially of SOX9 of the present disclosure include an exogenous OLIG, NKX, or OCT transcription factor, or an exogenous nucleic acid encoding any one or more of OLIG, NKX, or OCT transcription factor. It should also be understood that none of the PSCs consisting essentially of SOX9 of the present disclosure include an exogenous SRY, SOX1, SOX2, SOX3, SOX4, SOX5, SOX6, SOX7, SOX8, SOX10, SOX11, SOX12, SOX13, SOX14, SOX15, SOX17, SOX18, SOX21 or SOX30, or an exogenous nucleic acid encoding any one or more of SRY, SOX1, SOX2, SOX3, SOX4, SOX5, SOX6, SOX7, SOX8, SOX10, SOX11, SOX12, SOX13, SOX14, SOX15, SOX17, SOX18, SOX21 or SOX30.

Oligodendrocyte Progenitor Cells and Oligodendrocytes

Oligodendrocyte progenitor cells (OPCs) are a subtype of glial cells in the central nervous system characterized by expression of the proteoglycans PDGFRA and NG2 (CSPG4). They are precursors to oligodendrocytes, which are neuroglia that function to support and insulate axons by producing a myelin sheath wrapping. While mature oligodendrocytes cannot self-renew. OPCs can repopulate oligodendrocytes following an injury to the central nervous system in healthy individuals.

In some embodiments, an OPC or a population thereof expresses at least 1, at least 2, at least 3, at least 4, at least 5, at least 6, at least 7, at least 8, at least 9, at least 10, at least 11, at least 12, at least 13, at least 14, at least 15, or at least 16 oligodendrocyte genes selected from the group consisting of Myelin Basic Protein (MBP), NK2 Homeobox 1 (NKX2-1), Myelin Oligodendrocyte Glycoprotein (MOG), Myelin Associated Oligodendrocyte Basic Protein (MOBP), Oligodendrocyte Transcription Factor 2 (OLIG2), Chondroitin Sulfate Proteoglycan 4 (CSPG4), Oligodendrocyte Transcription Factor 1 (OLIG1), SRY-Box Transcription Factor 8 (SOX8), SRY-Box Transcription Factor 10 (SOX10), Myelin Regulatory Factor (MYRF), Platelet Derived Growth Factor Receptor Alpha (PDGFRA), Matrix Metallopeptidase 15 (MMP15), Protcolipid Protein 1 (PLP1), Transmembrane Protein 88B (TMEM88B), Ectonucleotide Pyrophosphatase/Phosphodiesterase 6 (ENPP6), and Neurofascin (NFASC).

In some embodiments, at least 1 gene is downregulated in an OPC or a population thereof. In some embodiments, at least 1, at least 2, at least 3, or at least 4 of the genes selected from the group consisting of Myelin Regulatory Factor (MYRF), POU Class 5 Homeobox 1 (POU5F1), Nanog Homeobox (NANOG), and SRY-Box Transcription Factor 2 (SOX2) is down-regulated in an OPC or a population thereof.

As stem cells develop into oligodendrocytes, each stage of development may be characterized by specific cell surface markers. For example, the membrane chondroitin sulfate proteoglycan NG2 (CSPG4) may be used as a marker of early-stage proliferative OPCs. Oligodendrocyte marker O4 may be used as an indicator of mid- to late-stage OPCs (Jackman, N et al., *Physiology* (24): 290-7 (2009)). In some embodiments, OPCs produced by the methods of the present disclosure are mid- to late-stage OPCs that express O4. Myelin Basic Protein (MBP) and Myelin Oligodendrocyte Glycoprotein (MOG) are expressed in terminal differentiation of OPCs to oligodendrocytes. They both are oligodendrocyte-specific genes and may be used as markers of mature oligodendrocytes formation. MOG is a membrane protein found on the surface of oligodendrocyte cells and on the outer layer of myelin sheaths. GalC is a galactosylceramidase enzyme found on oligodendrocyte membranes and may be used as a marker for late stage OPC (post-mitotic) and early mature oligodendrocyte. GalC may be used as a marker of terminal differentiation. In some embodiments, oligodendrocytes produced by the methods of the present disclosure may be mature oligodendrocytes that express MOG and/or GalC. Additional markers of the stages of oligodendrocyte development (e.g., markers for early-stage OPCs, intermediate and late-stage OPCs and mature oligodendrocytes) are known in the art and may be used as provided herein. See e.g., Jackman, N et al., *Physiology* (24):290-7 (2009).

In some embodiments, an oligodendrocyte expresses at least 1, at least 2, at least 3, at least 4, at least 5, or at least 6 biomarkers selected from the group consisting of 2',3'-Cyclic Nucleotide 3' Phosphodiesterase (CNPase), Proteolipid Protein 1 (PLP1), Galactosylceramidase (GALC), Myelin Oligodendrocyte Glycoprotein (MOG), Myelin Basic Protein (MBP), and Myelin Associated Glycoprotein (MAG).

In some embodiments, an OPC has been engineered to express SOX9 and/or comprises an engineered nucleic acid encoding SOX9.

Pluripotent Stem Cells

Provided herein are methods for reprogramming pluripotent stem cells to produce OPCs (e.g., O4-positive OPCs). Pluripotent stem cells are cells that have the capacity to self-renew by dividing, and to develop into the three primary germ cell layers of the early embryo, and therefore into all cells of the adult body, but not extra-embryonic tissues such as the placenta. Embryonic stem cells (ESCs) and induced pluripotent stem cells (iPSCs) are pluripotent stem cells. ESCs are derived from the undifferentiated inner mass cells of a embryo and are able to differentiate into all derivatives of the three primary germ layers: ectoderm, endoderm and mesoderm. iPSCs can be generated directly from adult cells (Takahashi, K; Yamanaka, S. *Cell* 126 (4): 663-76, 2006). In some embodiments, a pluripotent stem cell is an ESC. In some embodiments, a pluripotent cell is an iPSC. In some embodiments, a pluripotent stem cell is a human ESC. In some embodiments, a pluripotent cell is an iPSC. In some embodiments, a pluripotent cell is a human iPSC.

Pluripotent stem cells, such as an iPSC, may be engineered to express SOX9. In some embodiments, a differentiation agent consisting essentially of SOX9 or a nucleic acid encoding SOX9 is introduced into a pluripotent stem cell. In some embodiments, the only differentiation agent introduced into a pluripotent stem cell (e.g., iPSC) is SOX9 or a nucleic acid encoding SOX 9. In some embodiments, the only transcription factor introduced into a pluripotent stem cell (e.g., iPSC) is SOX9 or a nucleic acid encoding SOX 9.

Stem cells of the present disclosure are engineered. Engineered cells are cells that comprise at least one engineered (e.g., recombinant or synthetic) nucleic acid, or are otherwise modified such that they are structurally and/or functionally distinct from their naturally-occurring counterparts. Thus, a cell that contains an exogenous nucleic acid sequence is considered an engineered cell.

In some embodiments, an engineered cell of the present disclosure is an engineered pluripotent stem cell (e.g., an induced pluripotent stem cell), an oligodendrocyte progenitor cell (OPC), or an oligodendrocyte. As used herein unless indicated otherwise, a cell that is engineered to express SOX9 may be engineered to constitutively express SOX9 or engineered to inducibly express SOX9.

SRY-Box 9 (SOX9)

In some embodiments, pluripotent stem cells engineered to produce OPCs comprise SRY-box 9 (SOX9). SOX9 is a member of the SOX (SRY-related HMG-box) family of transcription factors, which are characterized by a high mobility group (HMG)-box DNA sequence. This HMG box is a DNA binding domain that is highly conserved throughout eukaryotic species. The Sox family has no singular function, and many members possess the ability to regulate several different aspects of development. SOX9 has been implicated in cartilage formation. Sec. e.g., Bi et al., Nat Genet. 1999 May; 22(1):85-9.

SOX9, or a homolog or variant thereof, as used herein, may be a human or other mammalian SOX9. Other SOX9 transcription factors (e.g., from other species), generally, are known and nucleic acids encoding SOX9 can be found in publically available gene databases, such as GenBank. In some embodiments, the nucleic acid encoding wild-type human SOX9 is at least 80% (e.g., at least 85%, 90%, 95%, 98% or 100%) identical to the open reading frame of the nucleic acid described in the NCBI RefSeq under accession number Z46629.

In some embodiments, a nucleic acid encoding SOX9 is at least 80% (e.g., at least 85%, 90%, 95%, 98% or 100%) identical to SEQ ID NO: 1. In some embodiments, an amino acid sequence encoding SOX9 is at least 80% (e.g., at least 85%, 90%, 95%, 98% or 100%) identical to SEQ ID NO: 2.

The SOX9 described herein may contain one or more amino acid substitutions relative to its wild-type counterpart. Variants can be prepared according to methods for altering polypeptide sequence known to one of ordinary skill in the art such as are found in references which compile such methods, e.g. Molecular Cloning: A Laboratory Manual, J. Sambrook, et al., eds., Second Edition, Cold Spring Harbor Laboratory Press, Cold Spring Harbor, New York, 1989, or Current Protocols in Molecular Biology, F. M. Ausubel, et al., eds., John Wiley & Sons, Inc., New York. Conservative substitutions of amino acids include substitutions made amongst amino acids within the following groups: (a) M, I, L, V; (b) F, Y, W; (c) K, R, H; (d) A, G; (e) S, T; (f) Q, N; and (g) E, D.

In some embodiments, the differentiation agent consists only of SOX9, or one or more copies of a nucleic acid encoding SOX9.

Methods for Producing OPCs

Provided herein are methods for producing OPCs. In some embodiments, the methods comprise introducing into pluripotent stem cells at least one engineered nucleic acid encoding SOX9, and culturing the pluripotent stem cells to produce OPCs. In some embodiments, the OPCs express O4, NG2, or a combination thereof.

The OPCs of the present disclosure may further comprise an anti-inflammatory cytokine. See, e.g., Opal et al., Chest. 2000 (4):1162-72 and Benveniste et al., Sci STKE. 2007 (416):pe70 for a discussion of anti-inflammatory cytokines. OPCs in the body do not naturally express anti-inflammatory cytokines (Cannella B, Raine CS. Ann. Neurol. 2004 January; 55 (1): 46-57). For example, the OPCs of the present disclosure may comprise a nucleic acid encoding an anti-inflammatory cytokine. In some embodiments, an anti-inflammatory cytokine reduces the ability of an OPC to activate the immune system (e.g., suppresses T-cell activation). In some embodiments, the level of proinflammatory cytokines (e.g., cytokines that activate the immune system, including IL17 and IFNγ) secreted by a T-cell in the presence and absence of an OPC may be used to determine the ability of an OPC to activate the immune system. In other embodiments, in vitro cell proliferation assays may be used to assess the effect of a cytokine (e.g., IL10 and IFNβ) that is expressed by an engineered OPC on T cell proliferation. Assays known in the art, including an enzyme-linked immunosorbent assay (ELISA) assay, may be used to determine cytokine levels (See Example 3 in the Examples section below). In some embodiments, an OPC harboring an anti-inflammatory cytokine reduces T-cell activation (e.g., as measured by a lower level of secreted proinflammatory cytokines) by at least 2-fold, 3-fold, 5-fold, 10-fold, 20-fold, 50-fold or 100-fold compared to an OPC not harboring the anti-inflammatory cytokine under the same or substantially conditions.

Suitable anti-inflammatory cytokines for the present disclosure include, but are not limited to, interferons and interleukins. For example, cells may be engineered to express interferon beta (IFNβ) and/or interleukin 10 (IL10). In some embodiments, an engineered OPC expresses/comprises IFNβ (e.g., also referred to herein as IFNβ1). In some embodiments, an engineered OPC expresses/comprises IL10. In some embodiments, an engineered OPC expresses/comprises both IFNβ and IL10. The sequences of the interferons and cytokines may be obtained from publically available databases, including National Center for Biotechnology Information's GenBank. An exemplary interferon beta 1 (IFNβ) sequence is listed under the GenBank Accession Identifier NM_002176. An exemplary IL10 sequence is listed under the GenBank Accession Identifier NM_000572. It should be understood that, in some embodiments, only the open reading frame is used to express SOX9 and the cytokines described herein.

The anti-inflammatory cytokines may be secreted or promote the secretion of another anti-inflammatory cytokine. For example, an anti-inflammatory cytokine may promote the secretion of IL10. In some embodiments, an OPC harboring an anti-inflammatory cytokine secretes at least 2-fold, at least 3-fold, at least 5-fold, at least 10-fold, at least 20-fold, at least 50-fold, at least 100-fold, at least 200-fold, at least 300-fold, at least 400-fold, at least 500-fold, at least 600-fold, at least 700-fold, at least 800-fold, at least 900-fold, at least 1,000-fold, at least 1,500-fold, at least 2,000-fold, at least 3,000-fold, at least 4,000-fold, at least 5,000-fold, at least 6,000-fold, at least 7,000-fold, at least 8.000-fold, at least 9,000-fold, or at least 10.000-fold more IL10 than a control counterpart not harboring the anti-inflammatory cytokine.

In some embodiments, an OPC harboring an anti-inflammatory cytokine secretes at least 2-fold, at least 3-fold, at least 5-fold, at least 10-fold, at least 20-fold, at least 50-fold, at least 100-fold, at least 200-fold, at least 300-fold, at least 400-fold, at least 500-fold, at least 600-fold, at least 700-fold, at least 800-fold, at least 900-fold, at least 1,000-fold, at least 1,500-fold, at least 2,000-fold, at least 3,000-fold, at least 4,000-fold, at least 5,000-fold, at least 6,000-fold, at least 7,000-fold, at least 8,000-fold, at least 9,000-fold, or at least 10,000-fold more IFNβ than a control counterpart not harboring the anti-inflammatory cytokine.

In some embodiments, iPSCs are engineered to express IL-10 and SOX9. In some embodiments, the engineered iPSCs differentiate into OPCs (e.g., O4+ cells) within 1-10 days of induction of expression of IL-10 and SOX9. In some embodiments, the engineered cells (e.g., iPSCs or OPCs) secrete IL-10. In some embodiments, the engineered cells (e.g., engineered iPSCs or engineered OPCs) secrete IL-10 at a level that is at least 50-fold, at least 60-fold, at least 70-fold, at least 80-fold, at least 90-fold, at least 100-fold, at least 200-fold, at least 300-fold, at least 400-fold, at least 500-fold, at least 600-fold, at least 700-fold, at least 800-fold, at least 900-fold, at least 1,000-fold, at least 1,500-fold, at least 2,000-fold, at least 3,000-fold, at least 4,000-fold, at least 5,000-fold, at least 6,000-fold, at least 7,000-fold, at least 8,000-fold, at least 9,000-fold, or at least 10,000-foldhigher than control cells. Control cells may be naturally-occurring iPSCs or OPCs, engineered iPSCs or engineered OPCs that are not specifically modified to express IL-10, or iPSCs or OPCs that are engineered to inducibly express IL-10 but are cultured under conditions that lack an inducing agent (i.e., IL-10 expression is not induced). In some embodiments, the control cell is the same type of cell (e.g., iPSC or OPC) as the engineered cell. In some embodiments, the iPSCs or OPCs secrete IL-10 at a level that is at least 50-fold, at least 60-fold, at least 70-fold, at least 80-fold, at least 90-fold, or at least 100-fold higher than control cells within 1-10 days of induction of expression of SOX9.

In some embodiments, an engineered cell secretes IL-10 (e.g., steadily/continuously) over the course of 1, 2, 3, 4, 5, 6, 7, 8, 9, 10, 11, 12, 13, 14, 15, 16, 17, 18, 19, or 20 days of culturing (e.g., in the presence of an inducing agent or in the absence of an inducing agent).

In some embodiments, iPSCs or iPSC-derived cells are engineered to express IL10 and/or IFNβ.

In some embodiments, iPSCs are engineered to express IFNβ and SOX9. In some embodiments, the engineered iPSCs differentiate into OPCs (e.g., O4+ cells) within 1-10 days of induction of expression of IFNβ and SOX9. In some embodiments, the engineered cells (e.g., engineered iPSCs or engineered OPCs) secrete IL-10. In some embodiments, the engineered cells (e.g., engineered iPSCs or engineered OPCs) secrete IL-10 at a level that is at least 50-fold, at least 60-fold, at least 70-fold, at least 80-fold, at least 90-fold, or at least 100-fold, at least 200-fold, at least 300-fold, at least 400-fold, at least 500-fold, at least 600-fold, at least 700-fold, at least 800-fold, at least 900-fold, at least 1,000-fold, at least 1,500-fold, at least 2,000-fold, at least 3,000-fold, at least 4,000-fold, at least 5,000-fold, at least 6,000-fold, at least 7,000-fold, at least 8,000-fold, at least 9,000-fold, or at least 10,000-fold higher than control cells. Control cells include naturally-occurring iPSCs or OPCs, engineered iPSCs or engineered OPCs that are not specifically modified to express IFNβ, or iPSCs or OPCs that are engineered to inducibly express IFNβ, but are cultured under conditions that lack an inducing agent. In some embodiments, the engineered iPSCs or engineered OPCs secrete IL-10 at a level that is at least 50-fold, at least 60-fold, at least 70-fold, at least 80-fold, at least 90-fold, or at least 100-fold higher than control cells within 1-10 days of induction of expression of IFNβ and SOX9.

In some embodiments, iPSCs are engineered to express IFNβ, IL-10, and SOX9. In some embodiments, the engineered iPSCs differentiate into OPCs (e.g., O4+ cells) within 1-10 days of induction of expression of IFNβ, IL-10, and SOX9. In some embodiments, the engineered iPSCs or engineered OPCs secrete IL-10. In some embodiments, the engineered cells (e.g., engineered OPCs or engineered iPSCs) secrete IL-10 at a level that is at least 50)-fold, at least 60-fold, at least 70-fold, at least 80-fold, at least 90-fold, or at least 100-fold, at least 200-fold, at least 300-fold, at least 400-fold, at least 500-fold, at least 600-fold, at least 700-fold, at least 800-fold, at least 900-fold, at least 1,000-fold, at least 1,500-fold, at least 2,000-fold, at least 3.000-fold, at least 4,000-fold, at least 5,000-fold, at least 6,000-fold, at least 7,000-fold, at least 8,000-fold, at least 9,000-fold, or at least 10,000-fold higher than control cells. Control cells include naturally-occurring iPSCs or OPCs, engineered iPSCs or engineered OPCs that are not specifically modified to express IFNβ and IL-10, and iPSCs or OPCs that are engineered to inducibly express IFNβ and IL-10, but are cultured under conditions that lack an inducing agent. In some embodiments, the engineered iPSCs or engineered OPCs secrete IL-10 at a level that is at least 50-fold, at least 60-fold, at least 70-fold, at least 80-fold, at least 90-fold, or at least 100-fold higher than control cells within 1-10 days of induction of expression of IFNβ, IL-10, and SOX9.

A nucleic acid, generally, is at least two nucleotides covalently linked together, and in some instances, may contain phosphodiester bonds (e.g., a phosphodiester "backbone"). A nucleic acid is considered "engineered" if it does not occur in nature. Examples of engineered nucleic acids include recombinant nucleic acids and synthetic nucleic acids. In some embodiments, an engineered nucleic acid encodes SOX9.

Nucleic acids encoding SOX9, IL-10, IFNβ, or a combination thereof as described herein may be introduced into a pluripotent stem cell using any known methods, including but not limited to chemical transfection, viral transduction (e.g. using lentiviral vectors, adenovirus vectors, sendaivirus, and adeno-associated viral vectors) and electroporation. For example, methods that do not require genomic integration include transfection of mRNA encoding SOX9 and/or a cytokine (e.g., IL-10, IFNβ, or a combination thereof) and introduction of episomal plasmids. In some embodiments, the nucleic acids (e.g., mRNA) are delivered to pluripotent stem cells using an episomal vector (e.g., episomal plasmid). In other embodiments, nucleic acids encoding transcriptions factors for reprogramming pluripotent stem cells may be integrated into the genome of the cell. Genomic integration methods are known, any of which may be used herein, including the use of the PIGGYBAC™ transposon system, sleeping beauty system, lentiviral system, adeno-associated virus system, and the CRISPR gene editing system.

In some embodiments, an engineered nucleic acid is present on PIGGYBAC™ transposon vector that comprises PIGGYBAC™ inverted terminal repeat sequences flanking a nucleotide sequence encoding a SOX9 and/or a cytokine (e.g., IL-10, IFNβ, or a combination thereof) and/or anti-inflammatory cytokine of the present disclosure. PIGGYBAC™ transposases are enzymes that recognize PIGGYBAC™ inverted terminal repeats on each side of an insertion sequence (e.g., sequence encoding a SOX9 and/or a cytokine (e.g., IL-10, IFNβ, or a combination thereof), excise the insertion sequence and insert the excised element into another nucleic acid. PIGGYBAC™ transposases may insert excised sequences into target sites with the sequence TTAA. An exemplary sequence encoding PIGGYBAC™ transposase is described in GenBank accession number: EF587698.

In some embodiments, SOX9 and/or a cytokine (e.g., IL-10, IFNβ, or a combination thereof) is cloned into a PIGGYBAC™ transposon vector then nucleofected at high copy numbers into iPSCs and integrated into the genome (e.g., an average of 10 copies per cell) by codelivering a PIGGYBAC™ transposase. In some embodiments, a high copy number integrated into the genome is 5 to 50 copies, inclusive, (e.g., average of 5 to 50 copies inclusive or exactly 5 to 50 copies inclusive) of a nucleotide sequence encoding a SOX9 and/or a cytokine (e.g., IL-10, IFNβ, or a combination thereof) per cell. In some embodiments, a cell has at least 5, 10, 15, 20, 25, or 50 copies of a nucleotide sequence encoding SOX9 and/or a cytokine (e.g., IL-10, IFNβ, or a combination thereof). In some embodiments, a cell has 15 copies of a nucleotide sequence encoding SOX9 and/or a cytokine (e.g., IL-10, IFNβ, or a combination thereof). In some embodiments, a cell has (or a population of cells on average have) 1 to 20 copies. 2 to 20 copies, 3 to 20 copies, 4 to 20 copies, 5 to 20 copies, 6 to 20 copies, 7 to 20 copies, 8 to 20 copies, 9 to 20 copies, 11 to 20 copies, 12 to 20 copies, 13 to 20 copies, 14 to 20 copies, 5 to 6 copies, 5 to 7 copies, 5 to 8 copies, 5 to 9 copies, 5 to 10 copies, 5 to 20 copies, 5 to 30 copies. 5 to 40 copies. 10 to 20 copies, 10 to 11 copies, 10 to 12 copies, 10 to 13 copies, 10 to 14 copies, 10 to 15 copies, 10 to 16 copies, 10 to 17 copies, 10 to 18 copies, 10 to 19 copies, 15 to 16 copies, 15 to 17 copies, 15 to 18 copies, 15 to 19 copies, 10 to 30 copies, 10 to 40 copies, 10 to 50 copies, 15 to 20 copies. 15 to 25 copies, 15 to 30 copies, 15 to 35 copies, 15 to 40 copies, 15 to 45 copies, 15 to 50 copies, 20 to 30 copies, 20 to 40 copies, 20 to 50 copies, 30 to 40 copies, 30 to 50 copies, or 40 to 50 copies of a nucleotide sequence encoding SOX9 and/or a cytokine (e.g., IL-10, IFNβ, or a combination thereof). In some embodiments, a cell has (or a population of cells on average have) 1, 2, 3, 4, 5, 6, 7, 8, 9, 10, 11, 12, 13, 14, 15, 16, 17, 18, 19, or 20 copies of a nucleotide sequence encoding SOX9 and/or a cytokine (e.g., IL-10, IFNβ, or a combination thereof). In some instances, the copy number refers to the average copy number of at least one nucleotide sequence encoding SOX9 and/or a cytokine per cell in a population of cells (e.g., in a polyclonal population of cells). In some instances, the copy number refers to the exact copy number of at least one nucleotide sequence encoding at SOX9 and/or a cytokine in a cell or of every cell in a population of cells (e.g., in a clonal population of cells).

In some embodiments, a population of pluripotent stem cells has on average less than 20 copies (but at least 1 copy) of an engineered nucleic acid encoding SOX9 per cell. In some embodiments, a population of pluripotent stem cells has on average less than 19 copies, less than 18 copies, less than 17 copies, less than 16 copies, less than 15 copies, less than 14 copies, less than 13 copies, less than 12 copies, less than 11 copies, less than 10 copies, less than 9 copies, less than 8 copies, less than 7 copies, less than 6 copies, less than 5 copies, less than 4 copies, less than 3 copies, or less than 2 copies (but at least 1 copy) of the engineered nucleic acid encoding SOX9 per cell.

In some embodiments, a high copy number may be obtained by introducing a high concentration of DNA into a population of cells. In some embodiments, a high concentration of DNA is a DNA concentration that is greater than or equal to 1,000 ng DNA per 1 million cells, greater than 2,000 ng DNA per 1 million cells, greater than 5,000 ng DNA per 1 million cells, or greater than 10,000 ng DNA per 1 million cells.

In some embodiments, a low copy number is obtained by introducing a low concentration of DNA into a population of cells. In some embodiments, a low concentration of DNA is a DNA concentration that is less than 1,000 ng DNA per 1 million cells, less than 500 ng DNA per 1 million cells, less than 400 ng DNA, less than 300 ng DNA per 1 million cells.

In some embodiments, a PSC comprises a level of an engineered nucleic acid encoding SOX9 that is sufficient to differentiate the PSC into an oligodendrocyte progenitor cell (OPC), in the absence of other transcription actors encoded by engineered nucleic acids. As disclosed herein, an oligodendrocyte progenitor cell may be identified by one or more markers, including, but not limited to O4 and other OPC-specific markers. In some embodiments, the average copy number of SOX9 in a population of PSCs cells (e.g., 1 to 5, 1 to 10, 1 to 15, or 1 to 20 copies) is sufficient to differentiate at least 10%, 20%, 30%, 40%, 50%, 60%, 70%, 80%, 90%, or 100% of the PSCs into OPCs.

A particular copy number or range of copy numbers may result in a percentage of cells expressing O4 and/or other OPC-specific markers. For example, at least 10% of a population of pluripotent stem cells may express O4 and/or other OPC-specific markers in a population of pluripotent stem cells that has a population average of 10 copies of SOX9. In some embodiments, at least 15% of a population of pluripotent stem cells may express O4 and/or other OPC-specific markers in a population of pluripotent stem cells that has a population average of 15 copies of SOX9. In some embodiments, at least 20% of a population of pluripotent stem cells may express O4 and/or other OPC-specific markers in a population of pluripotent stem cells that has a population average of 20 copies of SOX9. In some embodiments, at least 20% of a population of pluripotent stem cells may express O4 and/or other OPC-specific markers in a population of pluripotent stem cells that has a population average of 20 copies of SOX9. In some embodiments, 10-25% of a population of pluripotent stem cells may express O4 and/or other OPC-specific markers in a population of pluripotent stem cells that has a population average of 10 to 20 copies of SOX9.

In some embodiments, at least 10%, at least 15%, at least 20%, at least 30%, at least 40%, at least 50%, at least 60%, at least 70%, at least 80%, or at least 90% of a population of pluripotent stem cells may express O4 and/or other OPC-specific markers in a population of pluripotent stem cells that has a population average of 5 to 10, 5 to 15, or 5 to 20 copies of SOX9. In some embodiments, at least 10%, at least 15%, at least 20%, at least 30%, at least 40%, at least 50%, at least 60%, at least 70%, at least 80%, or at least 90% of a population of pluripotent stem cells may express O4 and/or other OPC-specific markers in a population of pluripotent stem cells that has a population average of 10 to 15 or 10 to 20 copies of SOX9. In some embodiments, at least 10%, at least 15%, at least 20%, at least 30%, at least 40%, at least 50%, at least 60%, at least 70%, at least 80%, or at least 90% of a population of pluripotent stem cells may express O4 and/or other OPC-specific markers in a population of pluripotent stem cells that has a population average of 10 to 15 or 10 to 20 copies of SOX9. In some embodiments, at least 10%, at least 15%, at least 20%, at least 30%, at least 40%, at least 50%, at least 60%, at least 70%, at least 80%, or at least 90% of a population of pluripotent stem cells may express O4 and/or other OPC-specific markers in a population of pluripotent stem cells that has a population average of 15 to 20 copies of SOX9.

The plasmid may be designed to be, for example, antibiotic resistant and/or inducible (e.g., doxycycline-inducible) in order to permit the selection of SOX9- and/or cytokine-integrated cells and/or to control transcription.

In some embodiments, a PIGGYBAC™ transposon vector comprises PIGGYBAC™ inverted terminal repeat sequences flanking a nucleotide sequence encoding SOX9. In some embodiments, a PIGGYBAC™ transposon vector comprises PIGGYBAC™ inverted terminal repeat sequences flanking a nucleotide sequence encoding at least one cytokine. In some embodiments, a PIGGYBAC™ transposon vector comprises PIGGYBAC™ inverted terminal repeat sequences flanking a nucleotide sequence encoding SOX9 and a cytokine. In some embodiments, the nucleotide sequence encoding SOX9 and at least one cytokine, in the same cassette flanked by PIGGYBAC™ inverted terminal repeat sequences. The at least two cytokines or SOX9 and the at least one cytokine in this cassette may be separated or not separated such that they produce unconnected proteins, for instance by separating the nucleic acids encoding a protein of interest (e.g., SOX9, a cytokine, or a combination thereof) by internal ribosome entry sites (IRES) or polypeptide cleavage signals such as 2A sequences. In some embodiments, the nucleotide sequence encoding IFNβ and/or IL 10 are flanked by PIGGYBAC™ inverted terminal repeat sequences.

In some embodiments, an engineered nucleic acid is present on an expression plasmid, which is introduced into pluripotent stem cells. In some embodiments, the expression plasmid comprises a selection marker, such as an antibiotic resistance gene (e.g., bsd, neo, hygB, pac, ble, or Sh bla) or a gene encoding a fluorescent protein (RFP, BFP, YFP, or GFP). In some embodiments, an antibiotic resistance gene encodes a puromycin resistance gene. In some embodiments, the selection marker enables selection of cells expressing a protein of interest. In some instances, the protein of interest is SOX9 or a cytokine.

Any of the engineered nucleic acids described herein may be generated using conventional methods. For example, recombinant or synthetic technology may be used to generate nucleic acids encoding SOX9, a cytokine, or a combination thereof described herein. Conventional cloning techniques may be used to insert SOX9, a cytokine, or a combination thereof into a PIGGYBAC™ transposon vector.

In some embodiments, an engineered nucleic acid (optionally present on an expression plasmid) comprises a nucleotide sequence encoding SOX9, a cytokine, or a combination thereof operably linked to a promoter (promoter sequence). In some embodiments, the promoter is an inducible promoter (e.g., comprising a tetracycline-regulated sequence). Inducible promoters enable, for example, temporal and/or spatial control of expression of SOX9, a cytokine, or a combination thereof.

A promoter control region of a nucleic acid sequence at which initiation and rate of transcription of the remainder of a nucleic acid sequence are controlled. A promoter may also contain sub-regions at which regulatory proteins and molecules may bind, such as RNA polymerase and other transcription factors. Promoters may be constitutive, inducible, activatable, repressible, tissue-specific or any combination thereof. A promoter drives expression or drives transcription of the nucleic acid sequence that it regulates. Herein, a promoter is considered to be "operably linked" when it is in a correct functional location and orientation in relation to a nucleic acid sequence it regulates to control ("drive") transcriptional initiation and/or expression of that sequence.

An inducible promoter is one that is characterized by initiating or enhancing transcriptional activity when in the presence of, influenced by or contacted by an inducing agent. An inducing agent may be endogenous or a normally exogenous condition, compound or protein that contacts an engineered nucleic acid in such a way as to be active in inducing transcriptional activity from the inducible promoter.

Inducible promoters for use in accordance with the present disclosure include any inducible promoter described herein or known to one of ordinary skill in the art. Examples of inducible promoters include, without limitation, chemically/biochemically-regulated and physically-regulated promoters such as alcohol-regulated promoters, tetracycline-regulated promoters (e.g., anhydrotetracycline (aTc)-responsive promoters and other tetracycline responsive promoter systems, which include a tetracycline repressor protein (tetR), a tetracycline operator sequence (tetO) and a tetracycline transactivator fusion protein (tTA)), steroid-regulated promoters (e.g., promoters based on the rat glucocorticoid receptor, human estrogen receptor, moth ecdysone receptors, and promoters from the steroid/retinoid/thyroid 25 receptor superfamily), metal-regulated promoters (e.g., promoters derived from metallothionein (proteins that bind and sequester metal ions) genes from yeast, mouse and human), pathogenesis-regulated promoters (e.g., induced by salicylic acid, ethylene or benzothiadiazole (BTH)), temperature/heat-inducible promoters (e.g., heat shock promoters), and light-regulated promoters (e.g., light responsive promoters from plant cells).

A preparation of pluripotent stem cells (e.g., expressing SOX9) may be cultured under standard stem cell culture conditions. For example, the pluripotent stem cells may be cultured in any commercially-available feeder-free maintenance medium for human ESCs and iPSCs, such as mTeSR™1 media. In some embodiments, the pluripotent stem cells are cultured in commercially-available stem cell media without added nutrients or growth factors.

A preparation of pluripotent stem cells (e.g., expressing SOX9) may be cultured, in some embodiments, for as few as 4 to 10 days before producing OPCs (e.g., O4-positive OPCs). In some embodiments, the pluripotent stem cells are cultured for 4-10 days, 4-9 days, 4-8 days, 4-7 days, 4-6 days or 4-5 days. In some embodiments, the pluripotent stem cells are cultured for less than 4 days (e.g., 1, 2 and 3 days) before producing OPCs (e.g., O4-positive OPCs). In some embodiments, at least 10% (at least 20%, 30%, 40%, 50%, 60%, 70% or 80%) of the cells of the preparation express O4 after only 4-10 days (e.g., 4, 5, 6, 7, 8, 9 or 10) of culture.

A preparation of pluripotent stem cells (e.g., expressing SOX9) may include, for example, $10^4$ to $10^{10}$ cells. In some embodiments, a preparation of pluripotent stem cells includes $10^4$, $10^5$, $10^6$, $10^7$, $10^8$, $10^9$, or $10^{10}$ cells.

Expression of O4 and other OPC-specific markers may be assessed based on protein expression or nucleic acid expression using known methods. Additional OPC-lineage markers include, but are not limited to. Sox1, Pax6. Nestin, Islet1, A2B5, Sox10, Olig2, Olig1, PDGFRa, NG2, RIP, O1, PLP1, CNPase, GalC, MBP, MAG and MOG. In some embodiments, an OPC does not express OCT4, Nanog, and/or SOX2. Exemplary methods include immunofluorescence using an anti-O4 antibody conjugated to a fluorophore, using western blot analysis with an anti-O4 antibody, quantitative polymerase chain reaction with primers targeting O4, and fluorescence activated cell sorting (FACS) with an anti-O4 antibody. In some embodiments, the methods further comprise sorting for O4-positive OPCs (e.g., using FACS).

In some embodiments, the methods further comprise culturing OPCs to produce oligodendrocytes. Culturing of OPCs may include the use of media comprising factors that induce oligodendrocyte differentiation, including growth hormones (e.g., fibroblast growth factors). Oligodendrocytes may be characterized by cell surface markers (e.g., MOG and GalC). Oligodendrocytes may also, or may alternatively, be characterized by their ability to form myelin. As exemplified below, cells engineered by the methods disclosed herein may be co-cultured with iPSC-derived neurons (e.g., in a polyethylene glycol mold) for a period of time (e.g., a few weeks) and assessed for myelination (e.g., the co-cultures can be fixed, embedded in resin, sectioned, stained and imaged using transmission electron microscopy to assess myelination). In some embodiments, the engineered cells of the present disclosure increase the number of myelinated axons by at least two-fold, at least 3-fold, at least 4-fold, at least 5-fold, at least 6-fold, at least 7-fold, at least 8-fold, at least 9-fold, or at least 10-fold. In some embodiments, the extent of myelination may be calculated by determining the g-ratio. The axonal g-ratio is the ratio between the inner and the outer diameter of the myelin sheath. In some embodiments, the axonal g-ratio from a subject who has been administered any of the engineered cells of the present disclosure is similar to the g-ratio of myelin from a control (e.g., the subject prior to administration of the engineered cells or a healthy subject). In some embodiments, the axonal g-ratio from a subject who has been administered any of the engineered cells of the present disclosure is similar to the axonal g-ratio from a control (e.g., the subject prior to administration of the engineered cells or a healthy subject) if the axonal g-ratio of myelin from the subject is on average between 0.6-0.8. See, e.g., Mohammadi et al., Front Neurosci. 2015 Nov. 27; 9:441.

In some embodiments, the OPCs described herein have been engineered to express IL-10 and/or IFNβ. In some embodiments, the OPCs are cultured to express IL-10 and/or IFNβ (e.g., with an inducing agent if cytokine expression is controlled by an inducible promoter). Without being bound by a particular theory, OPCs engineered to express IL-10 and/or IFNβ may be useful in the treatment of a subject with a myelin degenerative disease (e.g., Multiple Sclerosis). Without being bound by a particular theory, immune-tolerant cells such as engineered OPCs with capability to secrete IL10 and IFNβ not only can regenerate and remyelinate the axons but can also protect itself and adjacent cells from the immune attack. In some embodiments, OPCs engineered to secrete IL10 and IFNβ may reduce or suppress the immune response of a host to administered OPCs and promote regeneration.

In some embodiments, the engineered OPCs are cultured with other cells (e.g., neurons) to produce a myelinated organoid. In some embodiments, the myelinated organoid is transplanted into a subject in need thereof (e.g., a subject with a demyelinating disorder). In some embodiments, the organoid is a cerebral organoid (e.g., partial or complete cerebral organoid). In some embodiments, the engineered myelinated organoid is used to compound screening (e.g., therapeutic drugs) or disease modeling.

In some embodiments, the differentiation agent in a pluripotent stem cell (e.g., iPSC) and/or OPC consists essentially of SOX9.

Without being bound by a particular theory, limitations of established methods of cellular programming arise from attempting to mimic the protracted timeline and inherent complexity of developmental biology. During in vivo development, the process of cell type specification is intertwined with other regulatory events to spatiotemporally position the proper cell types in defined population sizes. As shown herein, in some embodiments, this limitation may be tackled by using synthetic biology-based cellular programming, which has the ability to decouple developmental processes. To achieve the engineering goal of fully controlling cell identity in a cell-autonomous manner, the differentiation process was isolated from other developmental events. Current protocols are reliant on external signals, such as soluble factors or mechanical cues. Therefore, it has been outstandingly challenging to control the development of different cell types independently within the same culture. Without being bound by a particular theory, controlling the development of different cell types independently within the same culture particularly important because tissues are composed of cells from different lineages and germ layers; as an example, the brain is composed of neural cells from the ectoderm lineage but is vascularized by endothelial cells derived from the mesoderm. Without being bound by a particular theory, current approaches using external cues are impractical for inducing both lineages simultaneously due to the incompatible induction conditions for each specialized cell type. However, the cell programming methods described herein, in some embodiments, can provide the tools necessary to achieve cell identity independent from external cues.

In some embodiments, a pluripotent stem cell (e.g., iPSC) consisting essentially of SOX9, or one or more copies of a nucleic acid encoding SOX9 is co-cultured with one or more other types of cells. In some embodiments, the other cell type is a pluripotent stem cell that has not been engineered to express a particular differentiation agent (i.e., an unmodified pluripotent stem cell) for orthogonal programming. In some embodiments, an unmodified pluripotent stem cell is a human iPSC (hiPSC). Without being bound by a particular theory, co-culturing of a pluripotent stem cell consisting of SOX9 or one or more copies of a nucleic acid encoding SOX9 with another type of pluripotent stem cell may be useful in incorporating myelinating oligodendrocytes into organoids to produce myelinated organoids. Non-limiting examples of organoids include whole brain organoids, spinal cord organoids, blood brain barrier organoids, and brain-region specific organoids (e.g., forebrain, midbrain, cerebellar, and hypothalamus brain organoids).

The nucleic acid encoding SOX9 may be operably linked to an inducible promoter and SOX9 expression may be induced at least 1 day, at least 2 days, at least 3 days, at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, or at least 20 days following co-culturing of the iPSC consisting essentially of a nucleic acid encoding SOX9 with one or more other types of cells. Differentiation media may be used during co-culture, e.g., to induce formation of neurons by the other types of cells (e.g., unmodified pluripotent stem cells).

In some embodiments, a pluripotent stem cell (e.g., iPSC) consisting essentially of SOX9 or one or more copies of a nucleic acid encoding SOX9 is co-cultured with a pluripotent stem cell that has been engineered to express at least one differentiation agent that is not SOX9 for parallel programming. A pluripotent stem cell (e.g., iPSC) consisting essentially of SOX9 or one or more copies of a nucleic acid encoding SOX9 may be co-cultured with another cell type for at least 1 day, at least 2 days, at least 3 days, at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, or at least 20 days. In some embodiments, expression of SOX9 and expression of the other differentiation agent are inducible. Expression of SOX9 and/or expression of the other differentiation agent may be induced for at least 1 day, at least 2 days, at least 3 days, at least 4 days, at least 5 days, at least 6 days, at least 7 days, at least 8 days, at least 9 days, at least 10 days, at least 11 days, at least 12 days, at least 13 days, at least 14 days, at least 15 days, at least 16 days, at least 17 days, at least 18 days, at least 19 days, or at least 20 days.

In some embodiments, a first population of pluripotent stem cells consisting essentially of SOX9 or one or more copies of a nucleic acid encoding SOX9 is cultured with 1 to 50 other populations of PSCs to produce multiple cell types. In some embodiments, a first population of pluripotent stem cells consisting essentially of SOX9 or one or more copies of a nucleic acid encoding SOX9 is cultured with at least 1, at least 2, at least 3, at least 4, at least 5, at least 6, at least 7, least 8, at least 9, at least 10, at least 11, at least 12, at least 13, at least 14, at least 15, at least 16, at least 17, at least 18, at least 19, at least 20, at least 25, at least 30, at least 35, at least 40, at least 45, or at least 50 other populations of PSCs to produce multiple cell types. The other population of PSCs comprises an engineered nucleic acid encoding a lineage-specifying gene. In some embodiments, 1 to 50 multiple cell types are produced. In some embodiments, at least 1, at least 2, at least 3, at least 4, at least 5, at least 6, at least 7, least 8, at least 9, at least 10, at least 11, at least 12, at least 13, at least 14, at least 15, at least 16, at least 17, at least 18, at least 19, at least 20, at least 25, at least 30, at least 35, at least 40, at least 45, or at least 50 multiple cell types are produced.

Pharmaceutical Compositions and Uses Thereof

Also provided herein are pharmaceutical composition comprising pluripotent stem cells (e.g., induced pluripotent stem cells), OPCs and/or oligodendrocytes produced by any of the methods disclosed herein. The pharmaceutical compositions may further comprise a pharmaceutically-acceptable carrier (e.g., a nanocarrier) or excipient. Hydrogels may also be used as pharmaceutically-acceptable carriers. Non-limiting examples of pharmaceutically-acceptable excipients include water, saline, dextrose, glycerol, ethanol and combinations thereof. The pharmaceutically-acceptable excipient may comprise phosphate buffered saline, a bicarbonate solution, a preservative, a stabilizing agent, an emulsifier (e.g., a phospholipid emulsifier), a solubilizing agent (e.g., surfactant), or a binding agent. The excipient may be selected on the basis of the mode and route of administration, and standard pharmaceutical practice.

General considerations in the formulation and/or manufacture of pharmaceutical agents, such as compositions comprising any of the engineered cells disclosed herein, may be found, for example, in Remington: The Science and Practice of Pharmacy 21st ed., Lippincott Williams & Wilkins, 2005 (incorporated herein by reference in its entirety).

Any of the pharmaceutical compositions disclosed herein may be administered to a subject (e.g., a human subject). Additional exemplary subjects include, but are not limited to, mice, rats, rabbits, horses, dogs, cats, goats, sheep and other animals. The subject may have a demyelinating disorder. Demyelinating disorders include disorders in which myelin surrounding axons is lost or damaged. Magnetic resonance imaging (MRI) may be used to diagnose a demyelinating disorder. Examples of demyelinating disorders include disorders in which myelin in the central nervous system is damaged. In some embodiments, the demyelinating disorder includes damage to OPCs. Examples of demyelinating disorders include multiple sclerosis, transverse myelitis, leukodystrophies (e.g., metachromatic leukodystropy (MLD) and adrenoleukodystropy (ALD)).

The term "an effective amount" or a "therapeutically effective amount" as used herein refers to the amount of OPCs and/or oligodendrocytes required to confer therapeutic effect on a subject, either alone or in combination with at least one other active agent. Effective amounts vary, as recognized by those skilled in the art, depending on the route of administration, excipient usage, and co-usage with other active agents. The quantity to be administered depends on the subject to be treated, including, for example, the strength of an individual's immune system or genetic predispositions. Suitable dosage ranges are readily determinable by one skilled in the art and may be on the order of micrograms of the polypeptide of this disclosure. The dosage of the preparations disclosed herein may depend on the route of administration and varies according to the size of the subject.

Suitable routes of administration include, for example, parenteral routes such as intravenous, intrathecal, parenchymal, or intraventricular routes. Suitable routes of administration include, for example, parenteral routes such as intravenous, intrathecal, parenchymal, or intraventricular injection.

EXAMPLES

Example 1: Identification of SOX9 as an Agent that Efficiently Differentiates Pluripotent Stem Cells (iPSCs) into Oligodendrocyte Progenitor Cells (OPCs)

Figure 1B:
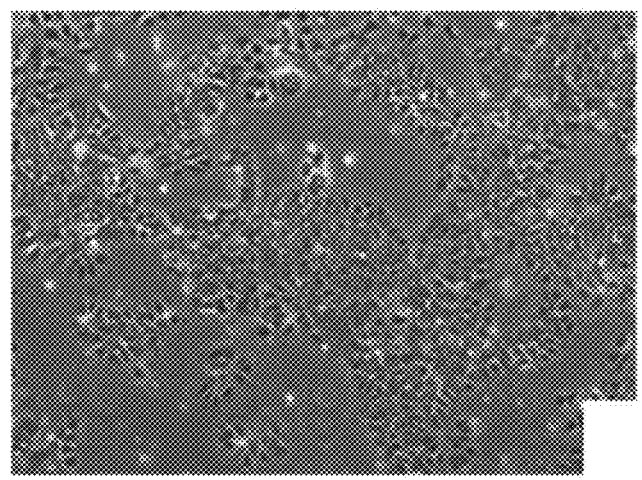
Figure 1C:
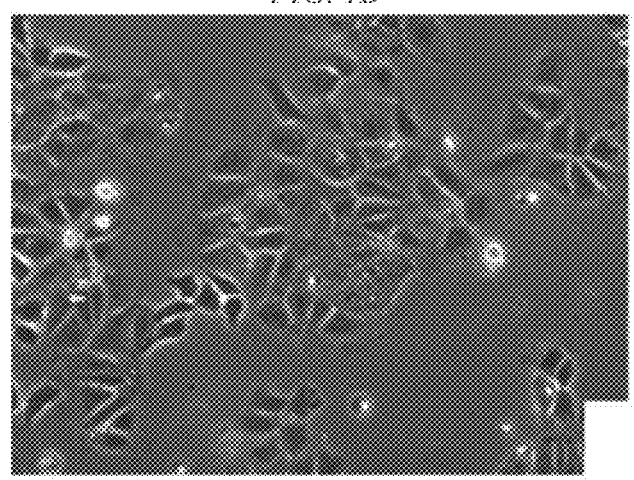

To determine the effect of SOX9 expression on human induced pluripotent stem cell (hiPSC) differentiation, SOX9 was over-expressed in hiPSCs. SOX9 has been implicated as the cardinal master regulator of chondrocyte development. Surprisingly, chondrocyte morphologies were not observed after SOX9 over-expression; instead, cells that were reminiscent of oligodendrocytes were detected. This striking observation was confirmed by staining the SOX9-induced differentiated cells with antibodies targeting O4, an OPC marker, and performing flow cytometry for differentiation. (FIGS. 1A-1C).

Figure 1D:
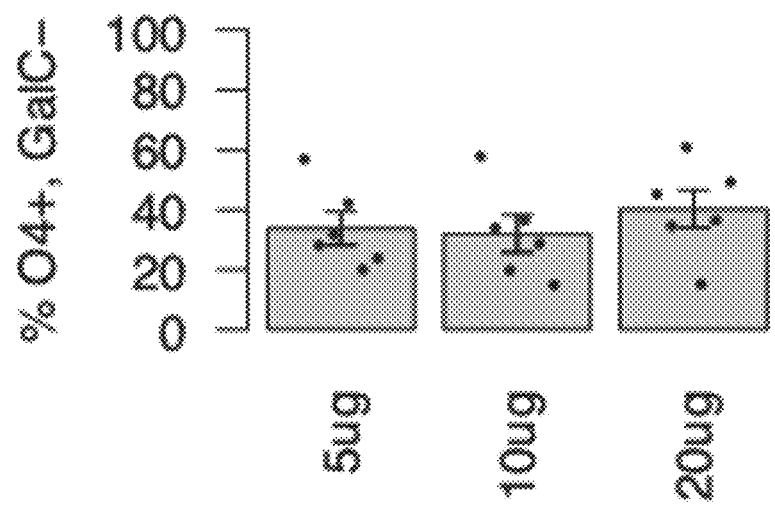

Indeed, up to 60% of the population were detected as O4+ cells (FIG. 1D) which was confirmed after transfecting the cells using various amounts of DNA, suggesting differentiation into OPCs. Although the entire population was selected for cells that had genomic integrations of SOX9, O4 marker expression was only observed in a fraction of the population. To determine whether specific expression levels of SOX9 may be needed to achieve potent differentiation, the heterogeneous transfection was leveraged to isolate clones with different number of SOX9 integrations, and hence different SOX9 expression levels.

Figure 2A:
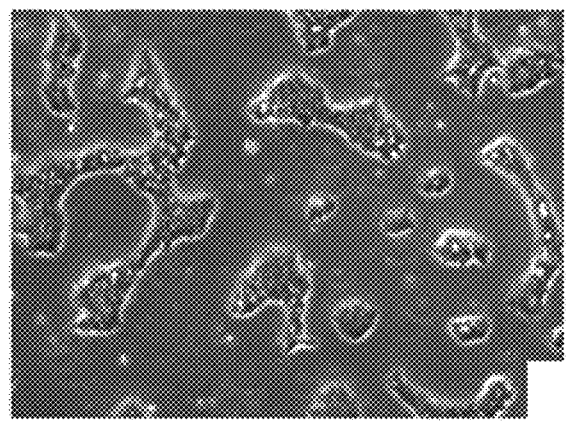
FIGS. 2A-2D show that specific SOX9 stem cell clones can achieve close to complete OPC differentiation.
Figure 2B:
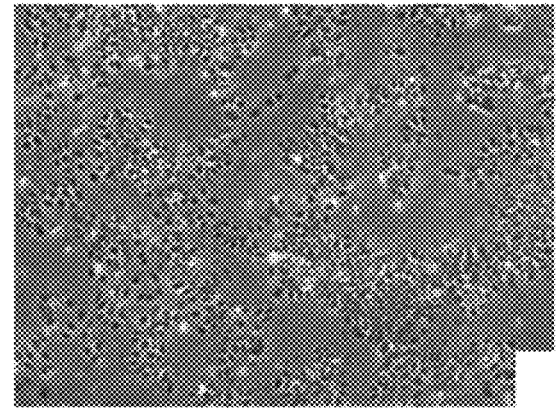

Individual clones were screened to identify several clones that achieved potent OPC differentiation. Significant morphological changes were observed in some clones after SOX9 overexpression, which was attributed to close-to-complete differentiation. This change in morphology was not seen in control cells in which the transcription factor (TF) was not induced (FIGS. 2A-2B).

Figure 2C:
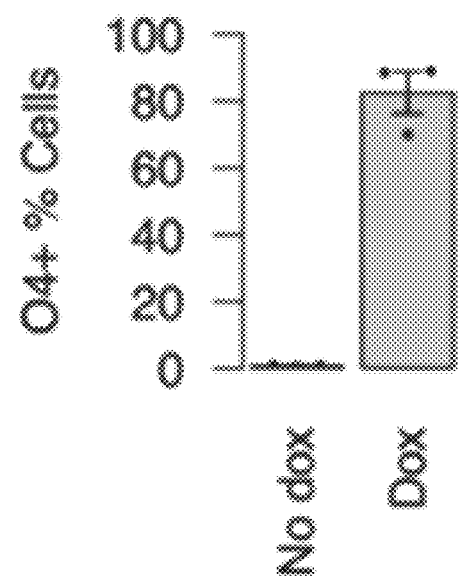
Figure 2D:
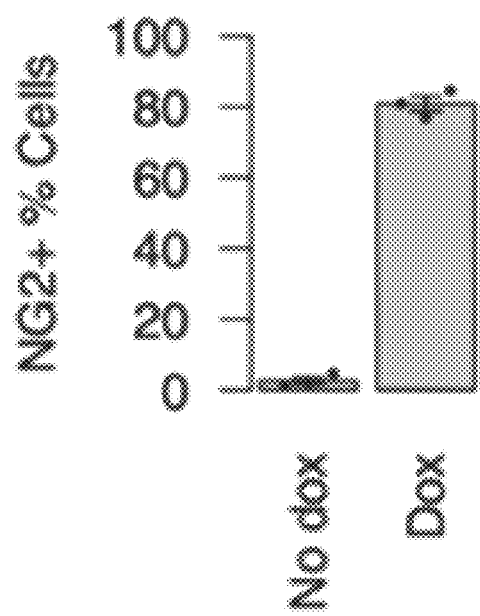

To characterize these clones, cells were fixed and stained for flow cytometry analysis for early OPC and late OPC that were picked based on the stage of development that they are normally expressed. High O4 and NG2 expression was observed in these clones, but not in not transfected controls, confirming the differentiation ability of SOX9-induced OPCs (FIGS. 2C-2D).

Example 2: Use of SOX9-Induced OPCs to Form Myelin In Vitro

Figure 3A:
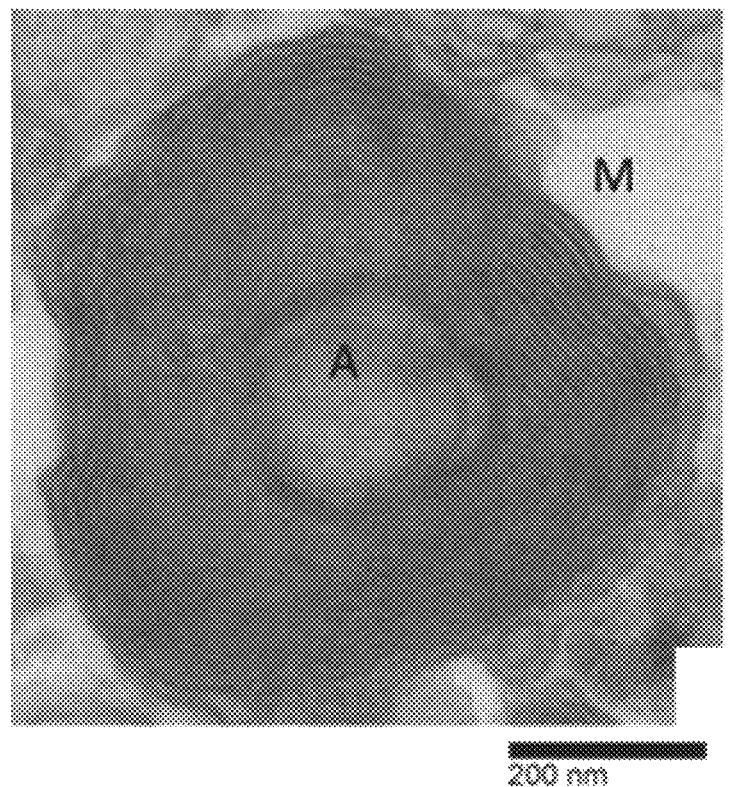
FIGS. 3A-3B show that SOX9-induced OPCs form compact myelin around hiPSC-derived neurons, and express mature markers in human cerebral organoids.

To evaluate the ability of SOX9-induced OPCs to mature and generate myelin, in vitro assays were used in which the SOX9-induced OPCs were co-cultured with hiPSC-induced neurons. To facilitate electron microscopy, the alignment of axon bundles was promoted by constructing micropatterned microgrooves, which encourage fasciculated bundles on neurons and keep such long-term cultures healthy. After 4 weeks of co-culture, cross-sections were performed the interaction between the two cell types were assessed by transmission electron microscopy. Strikingly, robust myelin formation was observed in the co-cultures (FIG. 3A). Multiple layers of compact myelin could be seen wrapping around an axon.

Figure 3B:
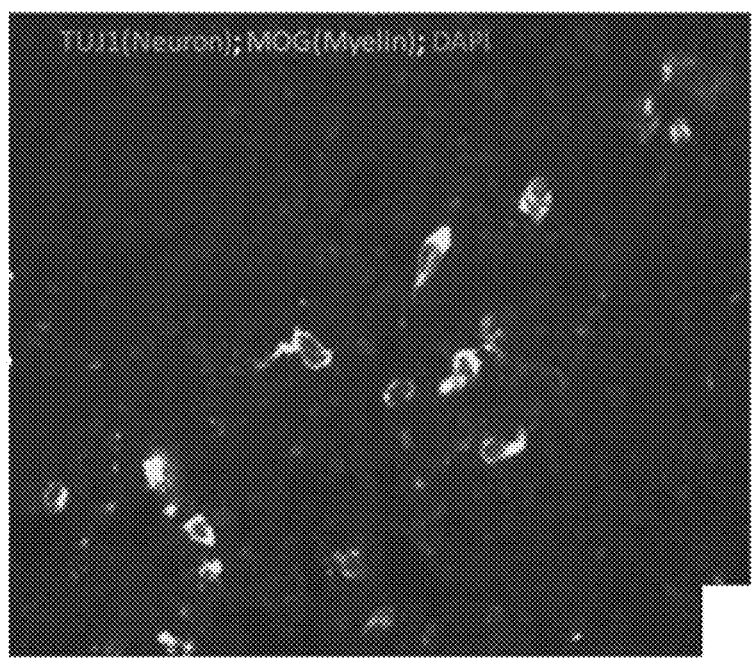

In order to show the ability of the programmed OPCs to form myelin in an even more physiological context, the programmed OPCs were incorporated in a human cerebral organoid model. This model best mimics the in vivo phenomena due to its complex structure and 3D organization which includes various human brain cell types. Unmodified hiPSCs were mixed with inducible SOX9 iPSCs. After 8 weeks, the organoids were sectioned and stained for mature myelin markers and compared them to the control where SOX9 was not over-expressed. FIG. 3B shows the MOG stained organoids, where MOG expression is observable in organoids after induction and not in those where SOX9 were not over-expressed. Myelination in this in vivo-like human model is a strong confirmation on functionality of the programmed OPCs.

Example 3: Production of Immune-Suppressive OPCs

Figure 4:
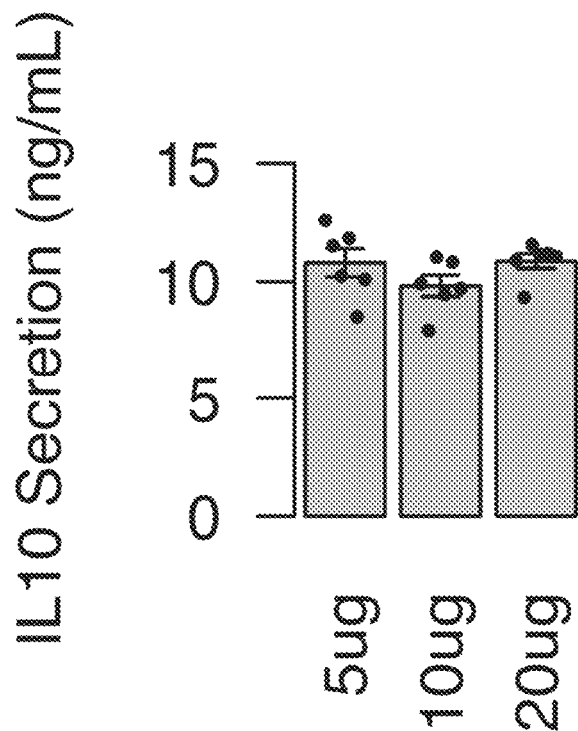
FIG. 4 shows that OPCs can be engineered to secrete anti-inflammatory cytokines. An ELISA assay was used to detect secreted the anti-inflammatory cytokine IL10 from differentiated OPCs engineered with different amounts of transfected DNA.

To create immune-suppressive OPCs, the iPSCs were engineered to over-express SOX9, IL10 and IFNβ1 and created stable cell lines. IL-10 and IFNβ1 are notable for the therapeutic benefits that they provide to MS patients, but these are not normally secreted by OPCs. Furthermore, it is not obvious that OPCs would have the secretion apparatus to produce these cytokines effectively. In contrast to adding growth factors to modulate OPC secretion, it was determined whether genetic engineering can achieve high secretion of IL-10 and IFNβ1 in an unnatural context within OPCs. The expression of these genes were induced in these stable cell lines by adding doxycycline to the media and measured the capability of these cells to release cytokines. It was found that OPCs were able to show cytokine-release 1000 times higher than uninduced control cells. Specifically, increased IL10 secretion (which also induces IFNβ1 secretion as its downstream target) was observed after 4 days of induction with doxycycline. IL10 was consistently secreted after transfection with various amounts of DNA (FIG. 4). IL10 is not released in the absence of doxycycline (control).

Example 4: Use of SOX9-Induced OPCs to Form Myelin In Vivo

Figure 5A:
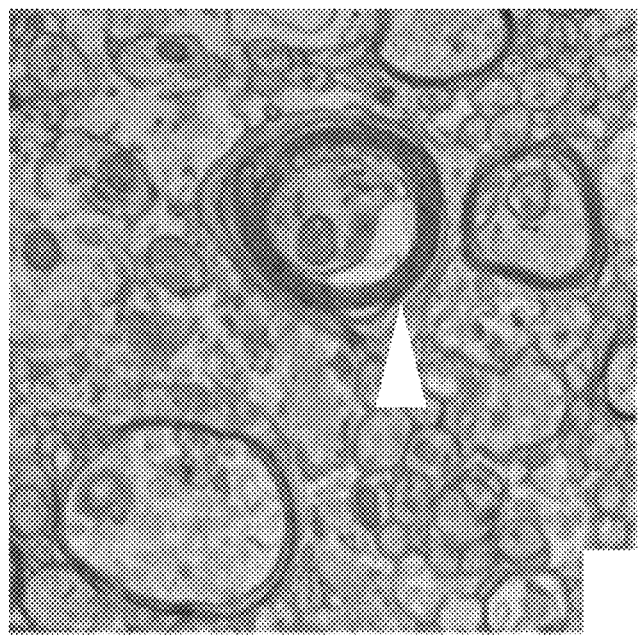
FIGS. 5A-5B include data showing that SOX9-induced OPCs can myelinate hypomyelinated axons in Shiverer mice.
Figure 5B:
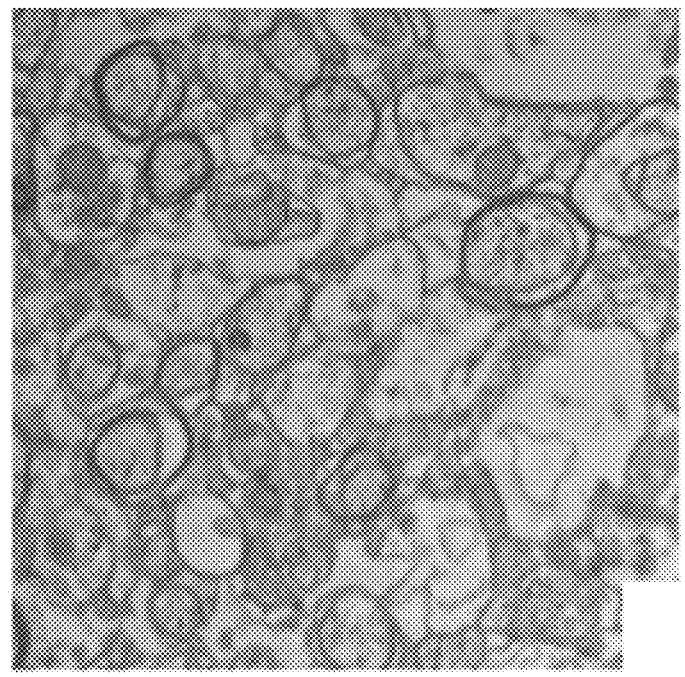

In order to confirm myelin formation in an in vivo setting, SOX9-induced OPCs were transplanted into the shiverer mouse model, a congenital genetic model where the myelin basic protein (MBP) gene is disrupted, and expression is impaired. No compact myelin forms in these mice. Due to the disrupted MBP gene, any compact myelin formation that is observed must be the result of transplanted cells that have engrafted. Neonatal homozygous shiverer mice (1-3 days after birth) were cryo-anesthesized and 50,000 purified O4+ cells were injected intracranially using the freehand method. The control group received the same procedure but instead of cells, they were injected with PBS with 0.1% Trypan blue. More compact myelin formation was detected in OPC-injected mice compared to the control group, confirming that these cells are able to engraft and are functionally capable of myelin formation (FIG. 5).

Figure 6:
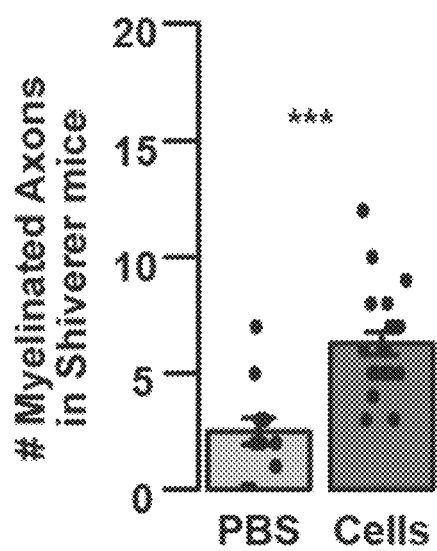
FIG. 6 shows Shiverer mice with transplanted SOX9-induced cells have significantly more myelinated axons than PBS-injected animals. Quantification of the number of myelinated axons from PBS-injected or SOX9-induced cell transplantation into Shiverer mice.

We also detected engraftment of SOX9-induced cells in immunostained brain sections weeks after transplantation based on the presence of MBP (data not shown), which can only be expressed in the donor cells. No MBP was observed in the control group. Furthermore, based on TEM of brain cross-sections, we observed compact myelin in mice transplanted with SOX9-induced cells, but rarely in the control group (data not shown). Quantifications showed a significantly increased number of myelinated axons in mice transplanted with cells compared to the control group (FIG. 6). Taken together, these results demonstrate that induction of SOX9 alone was sufficient to program hiPSCs cell-autonomously into induced oligodendrocytes and that the engineered stem cell-derived OPCs can form myelin where myelin deficiencies exist.

As shown herein, these cells can be further engineered with additional features such as the ability to secrete anti-inflammatory cytokines. Together, these synthetic OPCs are a promising candidate for diseases such as MS where the immune system degenerates oligodendrocytes (OLs).

Example 5: Parallel and Orthogonal Programming

Figure 7:
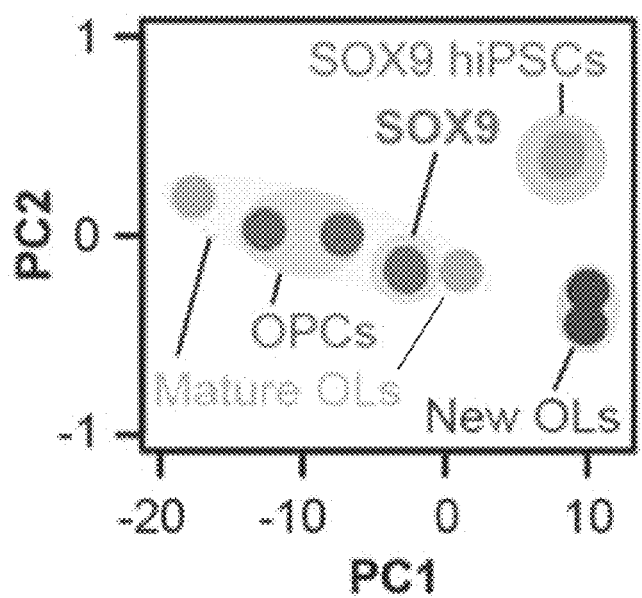
FIG. 7 shows SOX9-induced cells are transcriptomically similar to primary oligodendrocytes. Principal component (PC) analysis of RNA-seq samples from SOX9-induced cells overlap with samples from primary mature oligodendrocytes (OL), with similarity to oligodendrocyte progenitor cells (OPCs), and are distinctly separated from newly formed oligodendrocytes (Ols) and PGP1 hiPSCs.

The cell autonomous differentiation approach was used to address one of the major limitations in organoid engineering, where long developmental timelines delay the emergence of certain critical cell types. The complexity of cerebral organoids, for instance, is in part limited by the slow development of myelin, which requires 103-210 days to form mature myelin. To resolve the lack of transcription factor (TF)-mediated, media-independent protocols to differentiate myelin-producing oligodendrocytes, the Human TFome library was leveraged to discover individual TFs for programming oligodendrocytes to synthetically accelerate myelination. Fifteen TFs involved in oligodendrocyte development were identified, and their ranks were queried in the screen, which resulted in SOX9 as the top hit. SOX9-induced cells expressed the hallmark oligodendrocyte progenitor marker O4 (82±6%) at 4 dpi without additional lineage-specifying cues (FIG. 2C and data not shown). Induced SOX9 cells were also positive for NG2 (FIG. 2D, and immunostaining data not shown). The oligodendrocyte transcriptomic signatures were observed to be similar to primary oligodendrocytes based on unbiased PCA (FIG. 7), up-regulation of key oligodendrocyte genes, including MBP, NKX2-1, MOG, MOBP, OLIG2, CSPG4, OLIG1, SOX8, SOX10, MYRF, PDGFRA, MMP15, PLP1, TMEM88B, ENPP6, and NFASC (data not shown) and transcriptomic comparison of highly variable genes (data not shown). Expression of oligodendrocyte markers CSPG4 (NG2) and MYRF by scRNA-seq was also detected (data not shown). Pluripotency genes, including MYRF, POUSF1, NANOG, and SOX2, were down-regulated in both scRNA-seq and bulk RNA-seq (data not shown).

Figure 8:
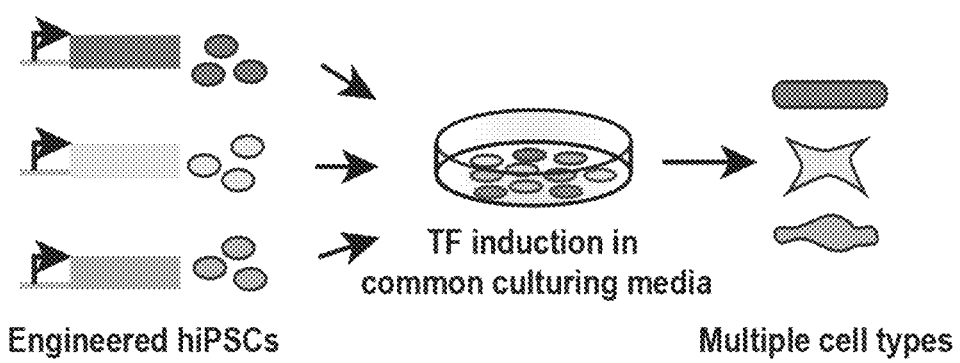
FIG. 8 shows a schematic of parallel programming where engineered human induced pluripotent stem cells (hiPSCs) inducibly express transcription factors (TFs) for differentiation are co-cultured in a dish. TFs are induced and multiple cell types are produced in the same culture medium. This schematic shows that parallel programming leverages cell-autonomous fate specification to enable simultaneous differentiation of multiple cell types in the same dish.
Figure 10A:
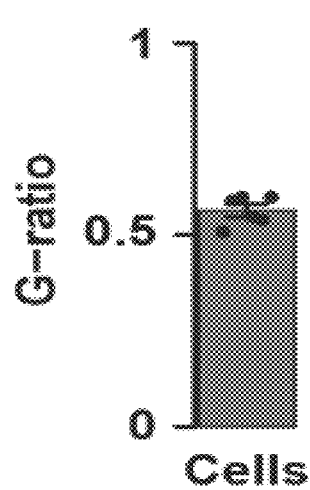
FIG. 10A shows quantification of G-ratio for myelin compaction is within the physiological range.

To address one of the main challenges in tissue engineering, which is to construct complex, physiological tissues, the set of three engineered hiPSC lines was harnessed based on TFs discovered using the Human TFome to introduce the concept of parallel programming. In this approach, multiple lineages co-develop simultaneously within the same dish to form a synthetic tissue in a media-independent manner (FIG. 8). To assess the myelination potential of SOX9-induced cells, the parallel programming approach was applied to produce a synthetic oligo-neuronal co-culture. Inducible SOX9 hiPSCs were combined along with fully characterized hiPSC-derived inducible neurons (Busskamp, V. et al. Mol Syst Biol 10, 760, (2014)), which project lengthy axons upon differentiation. TF expression was then activated, and at 3 dpi without additional external culture-specific factors, oligodendrocytes contacting axons to initialize the ensheathment process were observed (data not shown). Robust myelin sheaths around axons by TEM after 30 days of co-culture in photo-micropatterned microchannels were observed (data not shown). G-ratios were computed, a metric for compact myelin, to be 0.56±0.02 (FIG. 10A), which are comparable to those of physiological myelin (Stikov, N. et al. NeuroImage 118, 397-405, (2015)). These results confirmed the in vitro myelination functionality of SOX9-induced oligodendrocytes.

Figure 9:
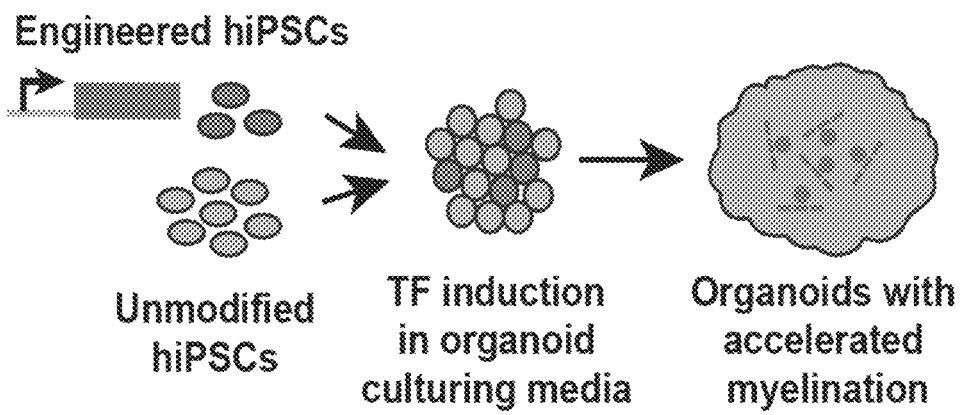
FIG. 9 shows a schematic of orthogonal programming where engineered hiPSCs for TF-inducible differentiation are incorporated at the genesis of developmentally-inspired cerebral organoids to synthetically accelerate myelination.
Figure 10B:
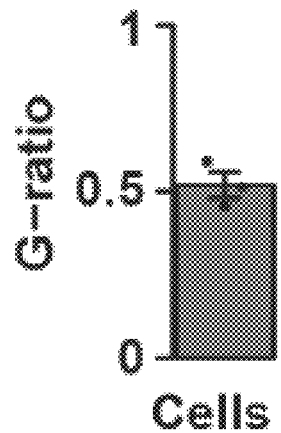
FIG. 10B shows quantification of G-ratio for myelin compaction in cerebral organoids shows physiological resemblance. ***P<0.001.

To synthetically accelerate myelination in cerebral organoids and construct more accurate models of human brain tissue, the extensively validated SOX9-induced oligodendrocytes were harnessed to introduce the concept of orthogonal cell programming (FIG. 9). In this orthogonal approach, an additional mode of differentiation is installed by cell-autonomous TF overexpression alongside external induction conditions (data not shown). To this end, inducible SOX9 hiPSCs were combined with unmodified hiPSCs and allowed embryoid body formation. After four days, doxycycline was added to induce SOX9 expression in the orthogonally programmed group and compared it with the control group where SOX9 was not induced. At 40 dpi, myelin oligodendrocyte glycoprotein (MOG) was observed in immunostained cross-sections of orthogonally programmed organoids (data not shown), but not in the controls. To determine the presence of compact myelin, TEM was performed on these cross-sections. Robust compact myelin formation within orthogonally programmed organoids was observed (data not shown), which confirmed the acceleration of myelin maturation as a result of orthogonal incorporation of SOX9-induced oligodendrocytes. To compare the myelinated axons within these organoids to those in vivo, the G-ratio was computed to be 0.52±0.04 (FIG. 10B), which proved physiological resemblance. Herein, the concept of orthogonal programming was introduced to synthetically accelerate myelination within cerebral organoids, which when generalized, may be an important step to achieve the entirety of each engineered tissue with a complete cell type repertoire.

Parallel Programming-Based In Vitro Myelination Assay.

SOX9-induced oligodendrocytes were co-cultured with iNGN hiPSC-derived neurons to assess myelin formation (Theodorou, E. et al. Genes Dev 23, 575-588, (2009)). To facilitate the preparation of cross-sections of myelinated axons, these cells were co-cultured within a microchannel mold that promotes the alignment of axons along the channel in one direction. The microchannel mold was constructed by adding a 10% (w/v) PEG-diacrylate (Mn 1000; Polysciences Inc., Warrington, PA) and 0.5% (w/v) Irgacure 2959 in PBS solution to a collagen-coated transwell (Theodorou, E. et al. Genes Dev 23, 575-588, (2009); Bhatia-Gaur, R. et al. Genes Dev 13, 966-977, (1999); Dutta, A. et al. Science 352, 1576-1580, (2016)). A negative mask was used to create the microchannel, followed by irradiation of the light-sensitive media with 181 mW/cm2 UV light for 30 seconds. SOX9 and iNGN hiPSCs were then seeded into the microchannel and TFs were induced by doxycycline. The co-culture was maintained in mTeSR1 for the first four days and then the media was replaced to preserve long term oligo-neuronal culture with the following components: DMEM-F12 with 1:200 N2 supplement, 1:100 B27 supplement lacking vitamin A, 1% penicillin/streptomycin/glutamine, 60 ng/ml T3, 10 ng/mL NT3, 10 ng/ML IGF-I, 200 µM AA, 1:1000 Trace Elements B, 2 ng/mL BDNF and 2 ng/mL GDNF32. After four weeks of co-culture, the constructs were fixed, embedded in resin, sectioned, stained and imaged using transmission electron microscopy as described above for the angiogenesis assay.

Orthogonal Cell Programming in Cerebral Organoids.

Cerebral organoids were generated as previously described (Liang, C. C., Park, A. Y. & Guan, J. L. Nature protocols 2, 329-333. (2007)) with minor modifications. To orthogonally program induced oligodendrocytes within cerebral organoids, inducible SOX9 hiPSCs and unmodified hiPSCs were dissociated with TrypLE Express (Life Technologies, 12604013), counted using an automated cell counter (Countess II, AMQAX1000, ThermoFisher Scientific) and mixed at a ratio of 1:1 in Aggrewell medium (STEMCELL Technologies, 05893). Next, the single cell suspension was transferred to Aggrewell400 plates (STEMCELL Technologies, 27945) for embryoid body formation. 600,000 cells were seeded into an Aggrewell plate containing Aggrewell medium with 10 µM Y-27632 ROCK inhibitor (Millipore, 688001). The plate was spun down at 100× g for 3 minutes and placed in a tissue culture incubator overnight. The next day (day 1 of the protocol), embryoid body formation was verified by brightfield microscopy and the media was changed to neural induction media (DMEM/F12, HEPES and GlutaMAX (Invitrogen, 11330-032) with N2 supplement (Gibco, A13707-01), non-essential amino acids (Gibco, 11140-050)). Half of the media was changed daily with neural induction media from days 1 to 3. On day 4, embryoid bodies were harvested by pipetting gently with a wide-bore tip to dislodge them from the Aggrewells, and were individually embedded in droplets of undiluted Matrigel (Corning, 354277). To induce TF expression for orthogonal programming, 0.5 µg/mL doxycycline was added daily into the media starting on day 4. On day 8, media was changed to neural differentiation media consisting of 1:1 DMEM/F12 containing HEPES and GlutaMAX (Invitrogen, 11330-032) and Neurobasal medium (Invitrogen, 12348-017) with non-essential amino acids (Gibco, 11140-050), N2 supplement (Gibco, A13707-01) and B27 supplement without vitamin A (Gibco, 12587-010). Media was replaced every other day. Organoids were harvested and sliced onto charged glass slides and stored at −20° C. until use. For staining, samples were brought to room temperature and outlined with a wax pen. They were washed three times with MAXwash Washing Medium (ActiveMotif, 15254) to remove any remaining OCT and then blocked using MAXblock Blocking medium (ActiveMotif, 15252) for 1 hour and then washed with MAXwash Washing Medium. Primary antibodies in binding buffer (ActiveMotif, 15251) were added and allowed to stain overnight. Samples were washed three times with wash buffer and then stained for 5 hours with secondary antibodies in binding buffer. Samples were washed with wash buffer, stained with DAPI, and then mounted for imaging using VectaShield mounting media.

Example 6: Long-Term Studies of Oligodendrocyte Maturation

In order to perform long term studies and explore the cell maturation and SOX9-induced OPC differentiation, an experimental scheme was developed where oligodendrocyte differentiation was induced in stem cell media initially, and then cells were cultured in oligodendrocyte differentiation or maintenance medium. This study was used to determine the effect of idealized conditions on the stability and maturation of the cells. Therefore, this experiment was designed as a time course to monitor intermediate steps of differentiation and maturation.

Microscopy images from different culturing conditions showed that after 15 days of culture, oligodendrocytes were branching out (data not shown). Microscopy images were also taken from the same study after 31 days of culture. Oligodendrocytes showed highly branched morphology, preparing to reach out to axons to begin the myelin ensheathment process (data not shown).

Immunohistochemistry was also performed on these cells for various markers. The cells were observed to be CNPase-positive, PLP1-positive GALC-positive, MOG-positive, MBP-positive and MAG-positive at day 18 after culture. MOG is a mature myelin protein. MBP is a signature myelin marker. MAG is another mature myelin marker. Branched out morphology of oligodendrocytes was also observed.

These results provide support for the robustness and reproducibility of the SOX9-induced OPC differentiation process.

Example 7: Determining the Effect of SOX9 Copy Number

Figure 11:
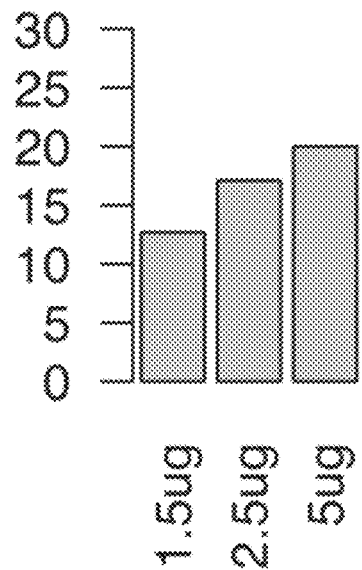
FIG. 11 is a graph showing that transfection of more SOX9 PIGGYBAC™ DNA increases the amount of SOX9 PIGGYBAC™ vectors that are integrated into the genome. The X-axis shows the amount of DNA transfected. The Y-axis shows the population average copy number of exogenous SOX9 plasmid.

To determine if the efficiency of SOX9-induced OPC differentiation could be improved by simply transfecting more SOX9 DNA, increasing amounts of SOX9 DNA was transfected into hiPSCs and made stable cell lines. 1.5 μg, 2.5 μg and 5ug of SOX9 DNA was transfected, and it was confirmed that increasing the amount of DNA transfected resulted in more genomically integrated SOX9 PIGGY-BAC™ plasmids, as determined by quantifying the population-average copy number of exogenous SOX9 using digital droplet PCR (ddPCR) on extracted genomic DNA (FIG. 11).

Figure 12:
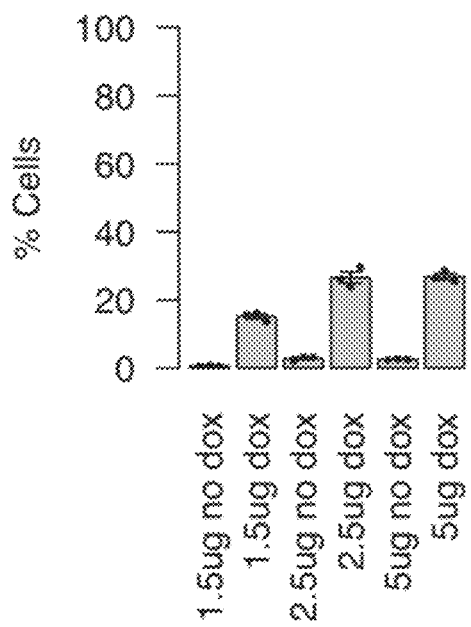
FIG. 12 is a graph showing that electroporation of increasing amounts of SOX9 DNA up to 2.5 µg improved OPC differentiation efficiency measured by flow cytometry for the percentage of O4+ cells.

It was then evaluated whether increasing the amount of genomically integrated SOX9 improves OPC differentiation efficiency. OPC differentiation efficiency was assessed by staining for O4 and using flow cytometry to quantify the percentage of O4-expressing cells. It was observed that cells transfected with 2.5 μg of SOX9 DNA had higher differentiation efficiency compared to those transfected with 1.5 μg. Surprisingly, 5 μg of SOX9 DNA did not further improve OPC differentiation efficiency, despite having more genomic copy numbers (FIG. 12).

These results suggest that less than 5ug of SOX9 DNA is needed to achieve high levels of OPC differentiation. In these cells, this translates to a population average of less than 20 copies of SOX9 per cell.

SEQUENCES

Non-limiting examples of nucleic acid and amino acid sequences encoding SOX9 are provided below. The nucleic acid sequences provided below were used in the examples described above.

Nucleic acid sequence encoding SOX9:
(SEQ ID NO: 1)
ATGAATCTCCTGGACCCCTTCATGAAGATGACCGACGAGCAGGAGAAGGG
CCTGTCCGGCGCCCCCAGCCCCACCATGTCCGAGGACTCCGCGGGCTCGC
CCTGCCCGTCGGGCTCCGGCTCGGACACCGAGAACACGCGGCCCCAGGAG
AACACGTTCCCCAAGGGCGAGCCCGATCTGAAGAAGGAGAGCGAGGAGGA
CAAGTTCCCCGTGTGCATCCGCGAGGCGGTCAGCCAGGTGCTCAAAGGCT
ACGACTGGACGCTGGTGCCCATGCCGGTGCGCGTCAACGGCTCCAGCAAG
AACAAGCCGCACGTCAAGCGGCCCATGAACGCCTTCATGGTGTGGGCGCA
GGCGGCGCGCAGGAAGCTCGCGGACCAGTACCCGCACTTGCACAACGCCG
AGCTCAGCAAGACGCTGGGCAAGCTCTGGAGACTTCTGAACGAGAGCGAG
AAGCGGCCCTTCGTGGAGGAGGCGGAGCGGCTGCGCGTGCAGCACAAGAA
GGACCACCCGGATTACAACTACCAGCCGCGGCGGAGGAAGTCGGTGAAGA
ACGGGCAGGCGGAGGCAGAGGAGGCCACGGAGCAGACGCACATCTCCCCC
AACGCCATCTTCAAGGCGCTGCAGGCCGACTCGCCACACTCCTCCTCCGG
CATGAGCGAGGTGCACTCCCCCGGCGAGCACTCGGGGCAATCCCAGGGCC
CACCGACCCCACCCACCACCCCCAAAACCGACGTGCAGCCGGGCAAGGCT
GACCTGAAGCGAGAGGGGCGCCCCTTGCCAGAGGGGGCAGACAGCCCCC
TATCGACTTCCGCGACGTGGACATCGGCGAGCTGAGCAGCGACGTCATCT
CCAACATCGAGACCTTCGATGTCAACGAGTTTGACCAGTACCTGCCGCCC
AACGGCCACCCGGGGGTGCCGGCCACGCACGGCCAGGTCACCTACACGGG
CAGCTACGGCATCAGCAGCACCGCGGCCACCCCGGCGAGCGCGGGCCACG
TGTGGATGTCCAAGCAGCAGGCGCCGCCGCCACCCCCGCAGCAGCCCCCA
CAGGCCCCGCCGGCCCCGCAGGCGCCCCCGCAGCCGCAGGCGGCGCCCCC
ACAGCAGCCGGCGGCACCCCCGCAGCAGCCACAGGCGCACACGCTGACCA
CGCTGAGCAGCGAGCCGGGCCAGTCCCAGCGAACGCACATCAAGACGGAG
CAGCTGAGCCCCAGCCACTACAGCGAGCAGCAGCAGCACTCGCCCCAACA
GATCGCCTACAGCCCCTTCAACCTCCCACACTACAGCCCCTCCTACCCGC
CCATCACCCGCTCACAGTACGACTACACCGACCACCAGAACTCCAGCTCC
TACTACAGCCACGCGGCAGGCCAGGGCACCGGCCTCTACTCCACCTTCAC
CTACATGAACCCCGCTCAGCGCCCCATGTACACCCCCATCGCCGACACCT
CTGGGGTCCCTTCCATCCCGCAGACCCACAGCCCCCAGCACTGGGAACAA
CCCGTCTACACACAGCTCACTCGACCT Amino acid sequence encoding SOX9:
(SEQ ID NO: 2)
MNLLDPFMKMTDEQEKGLSGAPSPTMSEDSAGSPCPSGSGSDTENTRPQE
NTFPKGEPDLKKESEEDKFPVCIREAVSQVLKGYDWTLVPMPVRVNGSSK
NKPHVKRPMNAFMVWAQAARRKLADQYPHLHNAELSKTLGKLWRLLNESE
KRPFVEEAERLRVQHKKDHPDYKYQPRRRKSVKNGQAEAEEATEQTHISP
NAIFKALQADSPHSSSGMSEVHSPGEHSGQSQGPPTPPTTPKTDVQPGKA
DLKREGRPLPEGGRQPPIDFRDVDIGELSSDVISNIETFDVNEFDQYLPP
NGHPGVPATHGQVTYTGSYGISSTAATPASAGHVWMSKQQAPPPPPQQPP
QAPPAPQAPPQPQAAPPQQPAAPPQQPQAHTLTTLSSEPGQSQRTHIKTE -continued

QLSPSHYSEQQQHSPQQIAYSPFNLPHYSPSYPPITRSQYDYTDHQNSSS

YYSHAAGQGTGLYSTFTYMNPAQRPMYTPIADTSGVPSIPQTHSPQHWEQ

PVYTQLTRP

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The terms "about" and "substantially" preceding a numerical value mean±10% of the recited numerical value.

Where a range of values is provided, each value between the upper and lower ends of the range are specifically contemplated and described herein.

What is claimed is:

1. A pluripotent stem cell (PSC) comprising an engineered nucleic acid encoding a transcription factor consisting of SOX9 at a level sufficient to differentiate the PSC into an oligodendrocyte progenitor cell (OPC), wherein the OPC expresses one or more OPC markers at a level sufficient for the PSC to perform one or more OPC functions.

2. The PSC of claim 1, wherein the one or more OPC markers comprises O4, NG2, or both.

3. The PSC of claim 1, wherein the one or more OPC markers are expressed in less than 10 days from expression of the engineered nucleic acid encoding SOX9 in the PSC.

4. The PSC of claim 1, wherein the OPC displays an increase in the number of myelinated axons by at least two-fold.

5. A population of pluripotent stem cells (PSCs) comprising at least one engineered nucleic acid encoding a transcription factor consisting of SOX9 at a level sufficient upon induction to reprogram the population of PSCs directly into oligodendrocyte progenitor cells (OPCs).

6. The population of claim 5, wherein the OPCs express one or more OPC markers.

7. The population of claim 6, wherein the one or more OPC markers comprises O4, NG2, or both.

8. The population of claim 6, wherein the one or more OPC markers are expressed in less than 10 days from expression of the at least one engineered nucleic acid encoding SOX9.

9. The population of claim 6, wherein at least 40% of the OPCs express at least one marker of the one or more OPC markers.

10. The population of claim 5, wherein the OPCs display an increase in the number of myelinated axons by at least two-fold.

11. The population of claim 5, wherein at least 30%, at least 40%, at least 50%, or at least 60% of the OPCs express O4, NG2, or both.

12. The PSC of claim 1, wherein the OPC expresses a mature myelin marker.

13. The PSC of claim 1, wherein the one or more OPC functions comprises forming myelin.

14. The PSC of claim 1, wherein the one or more OPC functions comprises secreting a cytokine.

15. The PSC of claim 1, wherein the engineered nucleic acid encoding SOX9 is a PiggyBac vector.

16. The PSC of claim 1, wherein the engineered nucleic acid encoding SOX9 is operably linked to an inducible promoter.

17. The PSC of claim 1, wherein the OPC expresses at least one oligodendrocyte gene, wherein the at least one oligodendrocyte gene comprises one or more of: Myelin Basic Protein (MBP), NK2 Homeobox 1 (NKX2-1), Myelin Oligodendrocyte Glycoprotein (MOG), Myelin Associated Oligodendrocyte Basic Protein (MOBP), OLIG2 (Oligodendrocyte Transcription Factor 2), Chondroitin Sulfate Proteoglycan 4 (CSPG4), Oligodendrocyte Transcription Factor 1 (OLIG1), SRY-Box Transcription Factor 8 (SOX8), SRY-Box Transcription Factor 10 (SOX10), Myelin Regulatory Factor (MYRF), Platelet Derived Growth Factor Receptor Alpha (PDGFRA), Matrix Metallopeptidase 15 (MMP15), Proteolipid Protein 1 (PLP1), Transmembrane Protein 88B (TMEM88B), Ectonucleotide Pyrophosphatase/Phosphodiesterase 6 (ENPP6), and Neurofascin (NFASC).

18. The PSC of claim 1, wherein at least one pluripotency gene is down-regulated in the OPC and comprises one or more of: Myelin Regulatory Factor (MYRF), POU Class 5 Homeobox 1 (POU5F1), Nanog Homeobox (NANOG), and SRY-Box Transcription Factor 2 (SOX2).

19. The population of claim 5, wherein the PSCs comprise a population average of less than 20 copies of the at least one engineered nucleic acid encoding SOX9.

20. The population of claim 5, wherein the OPCs express at least one oligodendrocyte gene, wherein the at least one oligodendrocyte gene comprises one or more of: Myelin Basic Protein (MBP), NK2 Homeobox 1 (NKX2-1), Myelin Oligodendrocyte Glycoprotein (MOG), Myelin Associated Oligodendrocyte Basic Protein (MOBP), OLIG2 (Oligodendrocyte Transcription Factor 2), Chondroitin Sulfate Proteoglycan 4 (CSPG4), Oligodendrocyte Transcription Factor 1 (OLIG1), SRY-Box Transcription Factor 8 (SOX8), SRY-Box Transcription Factor 10 (SOX10), Myelin Regulatory Factor (MYRF), Platelet Derived Growth Factor Receptor Alpha (PDGFRA), Matrix Metallopeptidase 15 (MMP15), Proteolipid Protein 1 (PLP1), Transmembrane Protein 88B (TMEM88B), Ectonucleotide Pyrophosphatase/Phosphodiesterase 6 (ENPP6), and Neurofascin (NFASC).

* * * * *

SEQUENCE LISTING

<160> NUMBER OF SEQ ID NOS: 2

<210> SEQ ID NO 1
<211> LENGTH: 1527
<212> TYPE: DNA
<213> ORGANISM: Artificial Sequence
<220> FEATURE:
<223> OTHER INFORMATION: Synthetic Polynucleotide

<400> SEQUENCE: 1

```
atgaatctcc tggacccctt catgaagatg accgacgagc aggagaaggg cctgtccggc      60
gcccccagcc ccaccatgtc cgaggactcc gcgggctcgc cctgcccgtc gggctccggc     120
tcggacaccg agaacacgcg gccccaggag aacacgttcc ccaagggcga gcccgatctg     180
aagaaggaga gcgaggagga caagttcccc gtgtgcatcc gcgaggcggt cagccaggtg     240
ctcaaaggct acgactggac gctggtgccc atgccggtgc gcgtcaacgg ctccagcaag     300
aacaagccgc acgtcaagcg gcccatgaac gccttcatgg tgtgggcgca ggcggcgcgc     360
aggaagctcg cggaccagta cccgcacttg cacaacgccg agctcagcaa gacgctgggc     420
aagctctgga gacttctgaa cgagagcgag aagcggccct tcgtggagga ggcggagcgg     480
ctgcgcgtgc agcacaagaa ggaccacccg gattacaagt accagccgcg gcggaggaag     540
tcggtgaaga acgggcaggc ggaggcagag gaggccacgg agcagacgca catctccccc     600
aacgccatct tcaaggcgct gcaggccgac tcgccacact cctcctccgg catgagcgag     660
gtgcactccc ccggcgagca ctcggggcaa tcccagggcc caccgacccc acccaccacc     720
cccaaaaccg acgtgcagcc gggcaaggct gacctgaagc gagaggggcg ccccttgcca     780
gaggggggca gacagccccc tatcgacttc cgcgacgtgg acatcggcga gctgagcagc     840
gacgtcatct ccaacatcga gaccttcgat gtcaacgagt tgaccagta cctgccgccc      900 aacggccacc cggggtgcc ggccacgcac ggccaggtca cctacacggg cagctacggc     960
atcagcagca ccgcggccac cccggcgagc gcgggccacg tgtggatgtc caagcagcag    1020
gcgccgccgc caccccgca gcagccccca caggcccgc cggccccgca ggcgcccccg      1080
cagccgcagg cggcgccccc acagcagccg gcggcacccc cgcagcagcc acaggcgcac    1140
acgctgacca cgctgagcag cgagccgggc cagtcccagc gaacgcacat caagacggag    1200
cagctgagcc cagccacta cagcgagcag cagcagcact cgcccaaca gatcgcctac      1260 agccccttca acctcccaca ctacagcccc tcctacccgc ccatcacccg ctcacagtac    1320
gactacaccg accaccagaa ctccagctcc tactacagcc acgcggcagg ccagggcacc    1380
```

```
ggcctctact ccaccttcac ctacatgaac cccgctcagc gccccatgta caccccatc    1440 gccgacacct ctggggtccc ttccatcccg cagacccaca gccccagca ctgggaacaa    1500 cccgtctaca cacagctcac tcgacct                                       1527
```

<210> SEQ ID NO 2
<211> LENGTH: 509
<212> TYPE: PRT
<213> ORGANISM: Artificial Sequence
<220> FEATURE:
<223> OTHER INFORMATION: Synthetic Polypeptide

<400> SEQUENCE: 2

```
Met Asn Leu Leu Asp Pro Phe Met Lys Met Thr Asp Glu Gln Glu Lys
1               5                   10                  15

Gly Leu Ser Gly Ala Pro Ser Pro Thr Met Ser Glu Asp Ser Ala Gly
            20                  25                  30

Ser Pro Cys Pro Ser Gly Ser Gly Ser Asp Thr Glu Asn Thr Arg Pro
        35                  40                  45

Gln Glu Asn Thr Phe Pro Lys Gly Glu Pro Asp Leu Lys Lys Glu Ser
    50                  55                  60

Glu Glu Asp Lys Phe Pro Val Cys Ile Arg Glu Ala Val Ser Gln Val
65                  70                  75                  80

Leu Lys Gly Tyr Asp Trp Thr Leu Val Pro Met Pro Val Arg Val Asn
                85                  90                  95

Gly Ser Ser Lys Asn Lys Pro His Val Lys Arg Pro Met Asn Ala Phe
            100                 105                 110

Met Val Trp Ala Gln Ala Ala Arg Arg Lys Leu Ala Asp Gln Tyr Pro
        115                 120                 125

His Leu His Asn Ala Glu Leu Ser Lys Thr Leu Gly Lys Leu Trp Arg
    130                 135                 140

Leu Leu Asn Glu Ser Glu Lys Arg Pro Phe Val Glu Glu Ala Glu Arg
145                 150                 155                 160

Leu Arg Val Gln His Lys Lys Asp His Pro Asp Tyr Lys Tyr Gln Pro
                165                 170                 175

Arg Arg Arg Lys Ser Val Lys Asn Gly Gln Ala Glu Ala Glu Glu Ala
            180                 185                 190

Thr Glu Gln Thr His Ile Ser Pro Asn Ala Ile Phe Lys Ala Leu Gln
        195                 200                 205

Ala Asp Ser Pro His Ser Ser Gly Met Ser Glu Val His Ser Pro
    210                 215                 220

Gly Glu His Ser Gly Gln Ser Gln Gly Pro Pro Thr Pro Pro Thr Thr
225                 230                 235                 240

Pro Lys Thr Asp Val Gln Pro Gly Lys Ala Asp Leu Lys Arg Glu Gly
                245                 250                 255

Arg Pro Leu Pro Glu Gly Gly Arg Gln Pro Pro Ile Asp Phe Arg Asp
            260                 265                 270

Val Asp Ile Gly Glu Leu Ser Ser Asp Val Ile Ser Asn Ile Glu Thr
        275                 280                 285

Phe Asp Val Asn Glu Phe Asp Gln Tyr Leu Pro Pro Asn Gly His Pro
    290                 295                 300

Gly Val Pro Ala Thr His Gly Gln Val Thr Tyr Thr Gly Ser Tyr Gly
305                 310                 315                 320

Ile Ser Ser Thr Ala Ala Thr Pro Ala Ser Ala Gly His Val Trp Met
                325                 330                 335
```

-continued

```
Ser Lys Gln Gln Ala Pro Pro Pro Pro Gln Gln Pro Pro Gln Ala
            340             345             350

Pro Pro Ala Pro Gln Ala Pro Pro Gln Pro Gln Ala Ala Pro Pro Gln
        355             360             365

Gln Pro Ala Ala Pro Pro Gln Gln Pro Gln Ala His Thr Leu Thr Thr
    370             375             380

Leu Ser Ser Glu Pro Gly Gln Ser Gln Arg Thr His Ile Lys Thr Glu
385             390             395             400

Gln Leu Ser Pro Ser His Tyr Ser Glu Gln Gln Gln His Ser Pro Gln
            405             410             415

Gln Ile Ala Tyr Ser Pro Phe Asn Leu Pro His Tyr Ser Pro Ser Tyr
            420             425             430

Pro Pro Ile Thr Arg Ser Gln Tyr Asp Tyr Thr Asp His Gln Asn Ser
            435             440             445

Ser Ser Tyr Tyr Ser His Ala Ala Gly Gln Gly Thr Gly Leu Tyr Ser
        450             455             460

Thr Phe Thr Tyr Met Asn Pro Ala Gln Arg Pro Met Tyr Thr Pro Ile
465             470             475             480

Ala Asp Thr Ser Gly Val Pro Ser Ile Pro Gln Thr His Ser Pro Gln
            485             490             495

His Trp Glu Gln Pro Val Tyr Thr Gln Leu Thr Arg Pro
            500             505
```